(12) United States Patent
Lim

(10) Patent No.: US 11,950,011 B2
(45) Date of Patent: Apr. 2, 2024

(54) IMAGE SENSOR

(71) Applicant: SAMSUNG ELECTRONICS CO., LTD., Suwon-si (KR)

(72) Inventor: Jungwook Lim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/051,606

(22) Filed: Nov. 1, 2022

(65) Prior Publication Data

US 2023/0134685 A1  May 4, 2023

(30) Foreign Application Priority Data

Nov. 4, 2021  (KR) .................. 10-2021-0150857

(51) Int. Cl.
*H04N 25/77* (2023.01)
*H04N 25/59* (2023.01)
*H04N 25/771* (2023.01)
*H04N 25/772* (2023.01)
*H04N 25/773* (2023.01)

(52) U.S. Cl.
CPC ........... *H04N 25/77* (2023.01); *H04N 25/772* (2023.01); *H04N 25/773* (2023.01)

(58) Field of Classification Search
CPC .... H04N 25/77; H04N 25/772; H04N 25/773; H04N 25/66; H04N 25/75; H04N 25/771; H04N 25/59
See application file for complete search history.

(56) References Cited

U.S. PATENT DOCUMENTS

| | | | |
|---|---|---|---|
| 7,075,049 B2 | 7/2006 | Rhodes et al. | |
| 7,173,228 B2 * | 2/2007 | Benthien | H04N 25/621 |
| | | | 250/208.1 |
| 8,294,797 B2 | 10/2012 | Choe et al. | |
| 9,020,257 B2 | 4/2015 | El-Mahdy et al. | |
| 9,900,481 B2 * | 2/2018 | Geurts | H04N 25/771 |
| 10,512,214 B2 * | 12/2019 | Hashimoto et al. | H04N 25/771 |
| 11,637,980 B2 * | 4/2023 | Shim | H04N 25/75 |
| 11,665,443 B2 * | 5/2023 | Oh | H04N 25/75 |
| 2017/0085814 A1 | 3/2017 | Hynecek | |
| 2017/0099423 A1 | 4/2017 | Cremers et al. | |
| 2017/0150017 A1 | 5/2017 | Geurts et al. | |

FOREIGN PATENT DOCUMENTS

KR  10-1639382  7/2016

* cited by examiner

*Primary Examiner* — Marly S Camargo
(74) *Attorney, Agent, or Firm* — F. Chau & Associates, LLC

(57) ABSTRACT

In an image sensor including a pixel array having a plurality of pixels, each of the plurality of pixels includes: a first photodiode; a second photodiode having a larger light-receiving area than the first photodiode; a first floating diffusion node where charge generated in the first photodiode is accumulated; a second floating diffusion node where charge generated in the second photodiode is accumulated; a first capacitor accumulating charge overflowing from the first photodiode; a first driving transistor configured to generate an output signal corresponding to a voltage of the second floating diffusion node; and a second capacitor storing an amount of overflow charges according to an overflow operation for accumulating the overflowing charge and storing an amount of reset charges according to a reset operation for resetting the first floating diffusion node.

20 Claims, 12 Drawing Sheets

IMAGE SENSOR

CROSS-REFERENCE TO RELATED APPLICATION

This U.S. non-provisional patent application claims priority under 35 U.S.C. § 119 to Korean Patent Application No. 10-2021-0150857, filed on Nov. 4, 2021, in the Korean Intellectual Property Office, the disclosure of which is incorporated by reference in its entirety herein.

1. TECHNICAL FIELD

The inventive concept relates to an image sensor.

2. DISCUSSION OF RELATED ART

An image sensor is a device that captures a two-dimensional (2D) or three-dimensional (3D) image of an object. The image sensor generates an image of an object using photoelectric conversion elements that respond to light reflected from the object according to the intensity of the light. With recent advancements in complementary metal-oxide-semiconductor (CMOS) technology, CMOS image sensors using CMOS technology have been widely used.

A dynamic range of an image sensor may be increased by connecting a capacitor to a floating diffusion node. However, increasing a size of the capacitor may increase noise and reduce image quality.

SUMMARY

An embodiment of the inventive concept provides an image sensor that generates image data having a wide dynamic range and an improved signal-to-noise ratio (SNR) by using a capacitor for storing pixel signals corresponding to an amount of overflow charges.

According to an embodiment of the inventive concept, in an image sensor including a pixel array having a plurality of pixels, each of the plurality of pixels includes: a first photodiode;
   a second photodiode having a larger light-receiving area than the first photodiode; a first floating diffusion node where charge generated in the first photodiode is accumulated; a second floating diffusion node where charge generated in the second photodiode is accumulated; a first capacitor accumulating charge overflowing from the first photodiode; a first driving transistor configured to generate an output signal corresponding to a voltage of the second floating diffusion node; and
   a second capacitor storing an amount of overflow charges according to an overflow operation for accumulating the overflowing charge and storing an amount of reset charges according to a reset operation for resetting the first floating diffusion node.

According to an embodiment of the inventive concept, in an image sensor including a pixel array having a plurality of pixels, each of the plurality of pixels includes: a first photodiode; a second photodiode having a larger light-receiving area than the first photodiode; a first floating diffusion node where charge generated in the first photodiode is accumulated; a second floating diffusion node where charge generated in the second photodiode is accumulated; a third floating diffusion node where charge transferred from the first floating diffusion node is accumulated; a conversion gain transistor having one end connected to the third floating diffusion node and the other end connected to the second floating diffusion node; a first capacitor accumulating charge overflowing from the first photodiode; a first driving transistor configured to generate an output signal corresponding to a voltage of the second floating diffusion node; and a second capacitor storing an amount of overflow charges according to an overflow operation for accumulating the overflowing charge and storing an amount of reset charges according to a reset operation for resetting the first floating diffusion node.

According to an embodiment of the inventive concept, in an image sensor including a pixel array having a plurality of pixels, each of the plurality of pixels includes: a first photodiode; a second photodiode having a larger light-receiving area than the first photodiode; a first floating diffusion node where charge generated in the first photodiode is accumulated; a second floating diffusion node where charge generated in the second photodiode is accumulated; a third floating diffusion node where charge transferred from the first floating diffusion node is accumulated; a first capacitor accumulating charge overflowing from the first photodiode; a driving transistor configured to generate an output signal corresponding to a voltage of the third floating diffusion node; a second capacitor storing an amount of overflow charges according to an overflow operation for accumulating the overflowing charge and storing an amount of reset charges according to a reset operation for resetting the first floating diffusion node; a reset transistor having a first end connected to the second capacitor and a second other end receiving a reset voltage; a sample transistor configured to control the amount of overflow charges and the amount of reset charges to be stored in the second capacitor; a first select transistor configured to output, as a pixel signal, an output signal corresponding to a voltage of the second floating diffusion node to a column line; a second select transistor configured to respectively output, to the column line, the amount of overflow charges and the amount of reset charges stored in the second capacitor as an image signal and a reset signal; and a third select transistor configured to output, to the column line, at least a part of the output signal corresponding to the voltage of the third floating diffusion node as a pixel signal.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
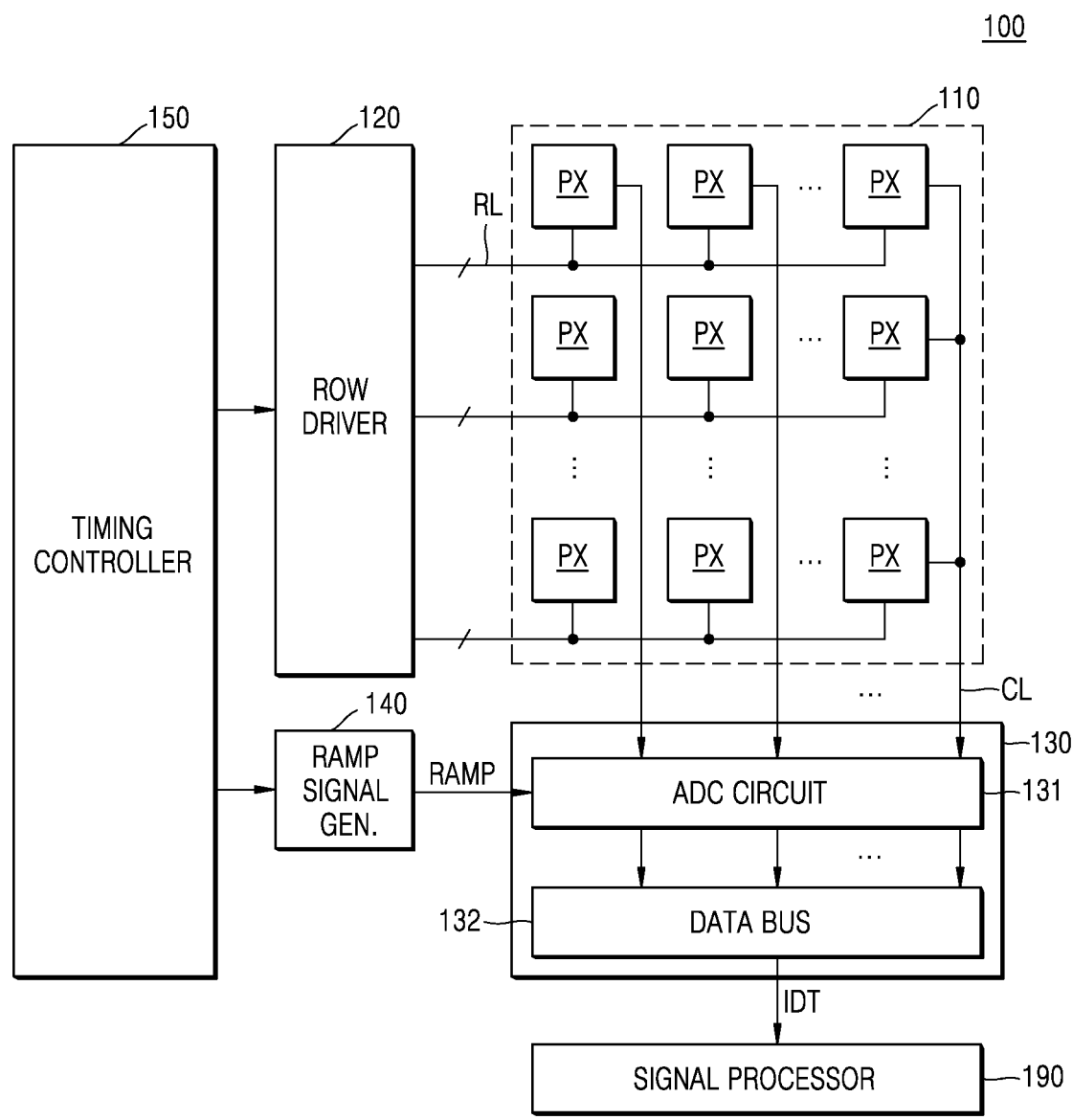
FIG. 1 is a block diagram of an image sensor according to an example embodiment of the inventive concept.

FIG. 1 is a block diagram of an image sensor 100 according to an example embodiment of the inventive concept.

The image sensor 100 may be mounted on an electronic device having an image or light sensing function. For example, the image sensor 100 may be mounted on electronic devices such as cameras, smartphones, wearable devices, Internet of Things (IoT) devices, household appliances, tablet personal computers (PCs), personal digital assistants (PDAs), portable multimedia players (PMPs), navigation devices, drones, advanced driver assistance systems (ADAS), etc. In addition, the image sensor 100 may be mounted on an electronic device provided as a component in vehicles, furniture, manufacturing equipment, doors, various measurement devices, etc.

Referring to FIG. 1, the image sensor 100 may include a pixel array 110, a row driver 120 (e.g., a driver circuit), a readout circuit 130, a ramp signal generator 140, a timing controller 150 (e.g., a control circuit), and a signal processor 190. The readout circuit 130 may include an analog-to-digital converter (ADC) circuit 131 and a data bus 132.

The pixel array 110 includes a plurality of row lines RL, a plurality of column lines CL, and a plurality of pixels PX connected to the row lines RL and the column lines CL and arranged in a matrix of rows and columns. The pixels PX may constitute an active pixel sensor (APS).

Each of the pixels PX may include at least one photoelectric conversion element and detect light using the photoelectric conversion element and output an image signal that is an electrical signal corresponding to the detected light. For example, a photoelectric conversion element may be a photo-sensitive element composed of an organic or inorganic material, such as an inorganic photodiode, an organic photodiode, a perovskite photodiode, a phototransistor, a photogate, a pinned photodiode, or the like. In an embodiment, each of the pixels PX may include a plurality of photoelectric conversion elements.

Moreover, a microlens for collecting light may be disposed on each of the pixels PX or each of pixel groups including adjacent pixels PX. Each of the pixels PX may detect light in a specific spectral region from light received via the microlens. For example, a pixel array 110 may include a red pixel for converting light in a red spectral region into an electrical signal, a green pixel for converting light in a green spectral region into an electrical signal, and a blue pixel for converting light in a blue spectral region into an electrical signal. A color filter for transmitting light in a specific spectral region may be disposed on each of the pixels PX. However, the inventive concept is not limited thereto, and the pixel array 110 may include pixels that convert light in a spectral region other than red, green, and blue regions into an electrical signal.

In an embodiment, the pixels PX may each have a multi-layer structure. The pixel PX having a multi-layer structure may include a plurality of photoelectric conversion elements that convert light in different spectral regions into electric signals, and electric signals corresponding to different colors may be generated by the photoelectric conversion elements. In other words, electrical signals respectively corresponding to a plurality of colors may be output from one pixel PX.

A color filter array for transmitting light in specific spectral regions may be disposed on the pixels PX, and a color detectable by each of the pixels PX may be determined according to a type of a color filter disposed on the corresponding pixel PX. However, the inventive concept is not limited thereto. For example, in an embodiment, a particular photoelectric conversion element may convert light in a specific wavelength band into an electrical signal according to a level of an electrical signal applied to the photoelectric conversion element.

A color filter array for transmitting light in specific spectral regions may be disposed on the pixels PX, and a color detectable by each of the pixels PX may be determined according to a type of a color filter disposed on the corresponding pixel PX. However, the inventive concept is not limited thereto. In some embodiments, a particular photoelectric conversion element may convert light in a specific wavelength band into an electrical signal according to a level of an electrical signal applied to the photoelectric conversion element.

In some embodiments, each of the pixels PX may include at least two photodiodes configured to be exposed to a light source. For example, the pixel PX may include a second photodiode (LPD in FIG. 2) that is a large photodiode having a relatively large light-receiving area and a first photodiode (SPD in FIG. 2) that is a small photodiode having a relatively small light-receiving area. Hereinafter, a small photodiode and a large photodiode are respectively referred to as a first photodiode SPD and a second photodiode LPD. A structure including the second photodiode LPD and the first photodiode SPD in one pixel PX may be referred to as a split photodiode structure. However, the inventive concept is not limited thereto, and the structure may also be referred to by another name.

The second photodiode LPD with a large light-receiving area may generate more charges than the first photodiode SPD under the same light-receiving conditions. In other words, the second photodiode LPD may have a higher sensitivity than the first photodiode SPD. Due to these properties, the second photodiode LPD may generate a pixel signal corresponding to low illuminance while the first photodiode SPD may generate a pixel signal corresponding to high luminance. Hereinafter, for convenience of description, it is assumed that the pixel PX includes the second photodiode LPD and the first photodiode SPD. However, the inventive concept is not limited thereto, and the pixel PX may include a plurality of photodiodes having the same or different light-receiving areas.

In each of the pixels PX, charges generated by a photoelectric conversion element such as a photodiode may be accumulated in a floating diffusion node, and the accumulated charges may be converted into a voltage. In this case, a rate at which charges accumulated in the floating diffusion node are converted into a voltage may be referred to as a conversion gain. The conversion gain may vary according to a capacitance of the floating diffusion node.

When the capacitance of the floating diffusion node increases, the conversion gain may decrease, and when the capacitance of the floating diffusion node decreases, the conversion gain may increase. In some embodiments, each of the pixels PX may operate with a dual conversion gain. The dual conversion gain includes a low conversion gain (LCG) and a high conversion gain (HCG). Because a charge-to-voltage conversion ratio is higher in an HCG than in an LCG, the HCG may be applied to an operation of generating a pixel signal corresponding to a lower illuminance instead of the LCG. Hereinafter, for convenience of description, an operation mode in which a pixel signal is generated using an HCG is referred to as an HCG mode, and an operation mode in which a pixel signal is generated using an LCG is referred to as an LCG mode.

In some embodiments, the second photodiode LPD and the first photodiode SPD may each generate pixel signals in the dual conversion gain mode described above. The second photodiode LPD may operate in the HCG mode to generate a first pixel signal corresponding to a first illuminance interval that is a lowest illuminance interval, and operate in the LCG mode to generate a second pixel signal corresponding to a second illuminance interval with a higher illuminance than the first illuminance interval. In addition, the first photodiode SPD may operate in the HCG mode to generate a third pixel signal corresponding to a third illuminance interval with a higher illuminance than the second illuminance interval, and operate in the LCG mode to generate a fourth pixel signal corresponding to a fourth illuminance interval that is a highest illuminance interval. The first through fourth pixel signals may be generated within one frame period during which the pixel array 110 is scanned.

The first through fourth pixel signals generated using a dual conversion gain mode for each of the first photodiode SPD and the second photodiode LPD may be combined into a single image having a high dynamic range.

In some embodiments, each of the pixels PX may operate in a single exposure mode in which exposure is performed once or in a multiple exposure mode in which a plurality of exposures are performed. For example, the pixel PX may operate in a single exposure mode where pixel signals are generated by the first photodiode SPD and/or the second photodiode LPD after a single exposure operation. As another example, the pixel PX may operate in a multiple exposure mode where pixel signals are generated by the second photodiode LPD and/or the first photodiode SPD in response to a first exposure operation and then additional pixel signals are generated by the second photodiode LPD and/or the first photodiode SPD in response to a second exposure operation.

The row driver 120 may drive the pixel array 110 on a row-by-row basis. The row driver 120 may decode a row control signal (e.g., an address signal) received from the timing controller 150, and select at least one of row lines in the pixel array 110 in response to the decoded row control signal. For example, the row driver 120 may generate a selection signal for selecting one of a plurality of rows. Furthermore, the pixel array 110 outputs a pixel signal from a row selected by the selection signal provided from the row driver 120.

The row driver 120 may transmit control signals for outputting a pixel signal to the pixel array 110, and the pixel PX may output a pixel signal by operating in response to the control signals.

The ramp signal generator 140 may generate a ramp signal RAMP that increases or decreases with a certain slope and provide the ramp signal RAMP to the ADC circuit 131 of the readout circuit 130.

The readout circuit 130 may read out a pixel signal from pixels PX in a row selected by the row driver 120 among the pixels PX. In this case, the pixel signal may include a reset signal or an image signal (or a sensing signal). The readout circuit 130 may convert reset signals and image signals received from the pixel array 110 through the column lines CL into digital data based on the ramp signal RAMP from the ramp signal generator 140, thereby generating and outputting pixel values corresponding to the pixels PX on a row-by-row basis.

The ADC circuit 131 may include a plurality of ADCs respectively corresponding to the column lines CL. Each of the ADCs may compare the RAMP signal with a reset signal and an image signal received via a corresponding column line CL to calculation comparison results and generate a pixel value based on the comparison results. For example, an ADC may remove a reset signal from an image signal and generate a pixel value representing the amount of light sensed by the pixel PX.

A plurality of pixel values generated by the ADC circuit 131 may be output as image data IDT through a data bus 132. For example, the image data IDT may be provided to an image signal processor inside or outside the image sensor 100.

The data bus 132 may temporarily store pixel values output from the ADC circuit 131 and then output the stored pixel values to the signal processor 190. The data bus 132 may include a plurality of column memories and a column decoder. A plurality of pixel values stored in the column memories may be output as image data IDT according to control by the column decoder.

The ADC circuit 131 may include a plurality of correlated double sampling (CDS) circuits and a plurality of counter circuits. The ADC circuit 131 may convert pixel signals input from the pixel array 110 into pixel values that are digital signals. Each pixel signal received through each of the column lines CL is converted into a pixel value (e.g., a digital signal) by a CDS circuit and a counter circuit.

The CDS circuit may compare a pixel signal received via a column line CL with the ramp signal RAMP to output a comparison result. When a level of the ramp signal RAMP is equal to a level of the pixel signal, the CDS circuit may output a comparison signal that transitions from a first level (e.g., logic high) to a second level (e.g., logic low). A time point at which a level of the comparison signal transitions may be determined according to the level of the pixel signal.

The CDS circuit may sample and hold a pixel signal provided from a pixel PX according to a CDS technique, and perform double sampling of a specific noise level (e.g., a reset signal) and an image signal level to thereby generate a comparison signal based on a level corresponding to a difference between the noise level and the image signal level. The CDS circuit may sample the provided pixel signal by first reading out a reset signal and then reading out an image signal according to the CDS technique.

In some embodiments, the CDS circuit may include one or more comparators. A comparator may be implemented as, for example, an operational transconductance amplifier (OTA) (or a differential amplifier).

The timing controller 150 may control all operations of the image sensor 100. For example, the row driver 120 and the ramp signal generator 140 may respectively generate a selection signal and a ramp signal RAMP based on timing signals provided by the timing controller 150.

The signal processor 190 may perform noise reduction, gain control, waveform shaping, interpolation, white balancing, gamma processing, edge enhancement, binning, etc. on the image data IDT. The signal processor 190 may receive pixel signals from the data bus 132 and merge the received pixel signals to create an image having a high dynamic range. Moreover, in an embodiment, the signal processor 190 may be provided in a processor outside the image sensor 100.

Figure 2:
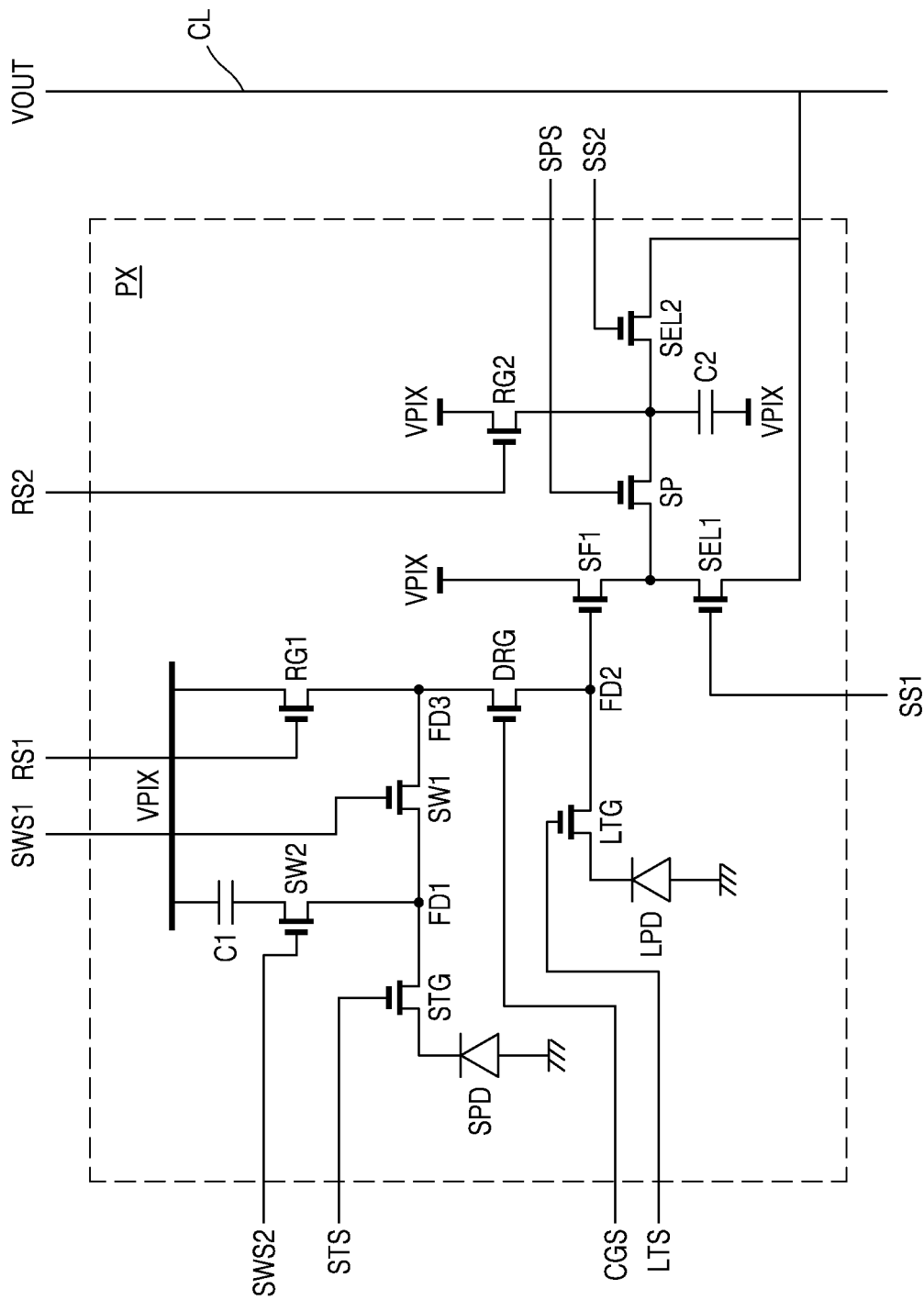
FIG. 2 is a circuit diagram of a pixel according to an example embodiment of the inventive concept.

FIG. 2 is a circuit diagram of a pixel according to an example embodiment of the inventive concept. In detail, FIG. 2 is a circuit diagram of a pixel PX of FIG. 1 according to an example embodiment of the inventive concept.

Referring to FIGS. 1 and 2, the pixel PX may include a plurality of photodiodes, e.g., the first photodiode SPD and the second photodiode LPD. The pixel PX may include a plurality of transistors, e.g., first and second transfer transistors STG and LTG, first and second reset transistors RG1 and RG2, a first driving transistor SF1, first and second select transistors SEL1 and SEL2, a gain control transistor DRG (also referred to as a conversion gain transistor DRG), first and second switch transistors SW1 and SW2, a sample transistor SP, a first capacitor C1, and a second capacitor C2. Control signals, i.e., first and second transfer control signals STS and LTS, first and second reset control signals RS1 and RS2, first and second selection signals SS1 and SS2, a conversion gain signal CGS, first and second switch signals SWS1 and SWS2, and a sample control signal SPS may be applied to the pixel PX, and at least some of them may be generated by the row driver 120.

The first photodiode SPD and the second photodiode LPD may generate photocharges that vary according to the intensity of incident light. For example, the second photodiode LPD and the first photodiode SPD may generate electric charges, i.e., negatively charged electrons and positively charged holes, in proportion to the amount of incident light. Photocharges generated by the first photodiode SPD and the second photodiode LPD may be transmitted to and accumulated in at least one of first through third floating diffusion nodes FD1 through FD3.

The pixel PX may include a first transfer transistor STG. The first transfer transistor STG may be connected between the first photodiode SPD and the first floating diffusion node FD1. The first transfer transistor STG may have a first terminal connected to an output terminal of the first photodiode SPD and a second terminal connected to the first floating diffusion node FD1. The first transfer transistor STG may be turned on or off in response to the first transfer control signal STS received from the row driver 120, and transmit a photocharge generated by the first photodiode SPD to the first floating diffusion node FD1. Charges generated by the first photodiode SPD may be accumulated in the first floating diffusion node FD1.

The pixel PX may include the first capacitor C1. The first capacitor C1 may have a first terminal connected to the second switch transistor SW2 and a second terminal to which a pixel voltage VPIX may be applied. However, the inventive concept is not limited thereto, and a voltage other than the pixel voltage VPIX may be applied to the second terminal of the first capacitor C1. According to an example embodiment of the inventive concept, charges may overflow from the first photodiode SPD due to an exposure operation, and the overflow charges may flow into the first floating diffusion node FD1 and be accumulated in the first capacitor C1. The overflow charges may be accumulated in the first capacitor C1 even when the first transfer transistor STG and the second switch transistor SW2 are turned off.

The pixel PX may include the first switch transistor SW1. The first switch transistor SW1 may have a first terminal connected to the first floating diffusion node FD1 and a second terminal connected to the third floating diffusion node FD3. The first switch transistor SW1 may be turned on or off in response to the first switch signal SWS1 received from the row driver 120, and connect the first floating diffusion node FD1 to the third floating diffusion node FD3.

The pixel PX may include the second switch transistor SW2. The second switch transistor SW2 may have a first terminal connected to the first floating diffusion node FD1 and a second terminal connected to the first capacitor C1. The second switch transistor SW2 may be turned on or off in response to the second switch signal SWS2 received from the row driver 120, and connect the first floating diffusion node FD1 to the first capacitor C1.

The pixel PX may include the first reset transistor RG1. The first reset transistor RG1 may reset charges accumulated in at least one of the first through third floating diffusion nodes FD1 through FD3. The first reset transistor RG1 may have a first terminal to which a reset voltage (e.g., a pixel voltage VPIX) may be applied and a second terminal connected to the third floating diffusion node FD3. However, the inventive concept is not limited thereto, and a voltage other than the pixel voltage VPIX may be applied to the first terminal of the first reset transistor RG1. The first reset transistor RG1 may be turned on or off in response to the first reset control signal RS1 received from the row driver 120, and charges accumulated in the third floating diffusion node FD3 may be drained out to reset the third floating diffusion node FD3.

The pixel PX may include the conversion gain transistor DRG. The conversion gain transistor DRG may have a first terminal connected to the third floating diffusion node FD3 and a second terminal connected to the second floating diffusion node FD2. The conversion gain transistor DRG may be turned on or off in response to the conversion gain signal CGS received from the row driver 120, and connect the third floating diffusion node FD3 to the second floating diffusion node FD2.

When the conversion gain control transistor DRG is turned on, the third floating diffusion node FD3 may be connected to the second floating diffusion node FD2 to increase a total capacitance of the second and third floating diffusion nodes FD2 and FD3 and accordingly reduce a conversion gain thereof. When the conversion gain control transistor DRG is turned on, the first and second photodiodes SPD and LPD may operate in the LCG mode. On the other hand, when the conversion gain transistor DRG is turned off, the first and second photodiodes SPD and LPD may operate in the HCG mode.

The pixel PX may include the second transfer transistor LTG. The second transfer transistor LTG may be connected between the second photodiode LPD and the second floating diffusion node FD2. The second transfer transistor LTG may have a first terminal connected to an output terminal of the second photodiode LPD and a second terminal connected to the second floating diffusion node FD2. The second transfer transistor LTG may be turned on or off in response to the second transfer control signal LTS received from the row driver 120, and transmit photocharges generated by the second photodiode LPD to the second floating diffusion node FD2.

The pixel PX may include the first driving transistor SF1. The first driving transistor SF1 may have a first terminal connected to the first select transistor SEL1 and a second terminal to which a driving voltage (e.g., a pixel voltage VPIX) may be applied. The first driving transistor SF1 may operate as a source follower and output, as an output signal, a voltage corresponding to charges accumulated in at least one of the first through third floating diffusion nodes FD1 through FD3. For example, the first driving transistor SF1 may generate an output signal corresponding to a voltage of the second floating diffusion node FD2.

The pixel PX may include the first select transistor SEL1. The first select transistor SEL1 may have a first terminal connected to the first driving transistor SF1 and a second terminal connected to a column line CL. The first select transistor SEL1 may be turned on or off in response to the first selection signal SS1 received from the row driver 120. When the first select transistor SEL1 is turned on during a readout operation, a pixel signal VOUT including a reset signal corresponding to a reset operation or an image signal corresponding to a charge accumulation operation may be output to the column line CL.

The pixel PX may include the second capacitor C2. The second capacitor C2 may have a first terminal connected to the sample transistor SP and a second terminal to which a pixel voltage VPIX may be applied. However, the inventive concept is not limited thereto, and a voltage other than the pixel voltage VPIX may be applied to the second terminal of the second capacitor C2. An amount of overflow charges and an amount of reset charges may be stored in the second capacitor C2. An amount of overflow charges may be an amount of charges that overflow and then are stored in the first capacitor C1 according to an overflow operation of accumulating the overflow charges in the first capacitor C1. An amount of reset charges may be an amount of charges corresponding to a voltage of the first floating diffusion node FD1 according to a reset operation of resetting the first floating diffusion node FD1.

The pixel PX may include the second reset transistor RG2. The second reset transistor RG2 may reset the charges accumulated in the second capacitor C2. The second reset transistor RG2 may have a first terminal to which a reset voltage (e.g., a pixel voltage VPIX) may be applied and a second terminal connected to the second capacitor C2. However, the inventive concept is not limited thereto, and a voltage other than the pixel voltage VPIX may be applied to the first terminal of the second reset transistor RG2. The second reset transistor RG2 may be turned on or off in response to the second reset control signal RS2 received from the row driver 120, and charges accumulated in the second capacitor C2 are drained out to reset the second capacitor C2.

The pixel PX may include the sample transistor SP. The sample transistor SP may have a first terminal connected to the first driving transistor SF1 and the first select transistor SEL1 and a second terminal connected to the second capacitor C2, the second reset transistor RG2, and the second select transistor SEL2. The sample transistor SP may be turned on or off in response to the sample control signal SPS received from the row driver 120, and control connection between the first driving transistor SF1 and the second capacitor C2. The sample transistor SP may control the amount of overflow charges and the amount of reset charges to be stored in the second capacitor C2.

The first reset transistor RG1 and the first switch transistor SW1 may be turned on to reset the first floating diffusion node FD1. When the conversion gain transistor DRG and the sample transistor SP are turned on, an amount of reset charges from the first driving transistor SF1 may be stored in the second capacitor C2. Charges overflowing from the first photodiode SPD may be accumulated in the first capacitor C1, and when the conversion gain transistor DRG, the first switch transistor SW1, and the sample transistor SP are turned on, an amount of charges overflowing from the first driving transistor SF1 may be stored in the second capacitor C2.

The pixel PX may include the second select transistor SEL2. The second select transistor SEL2 may have a first terminal connected to the second capacitor C2 and a second terminal connected to the column line CL. The second select transistor SEL2 may be turned on or off in response to the second selection signal SS2 received from the row driver 120. When the second select transistor SEL2 is turned on during a readout operation, an amount of reset charges or an amount of overflow charges may be output from the second capacitor C2 to the column line CL as the pixel signal VOUT. The first and second select transistors SEL1 and SEL2 may be selectively turned on.

According to an example embodiment of the inventive concept, the second photodiode LPD may generate pixel signals corresponding to a dual conversion gain via the gain control transistor DRG. As the gain control transistor DRG is turned on or off according to the gain control signal CGS that transitions to an active or inactive level corresponding to a specific conversion gain mode, the second photodiode LPD may generate pixel signals corresponding to a dual conversion gain.

For example, when the second photodiode LPD operates in the LCG mode during a readout period, the gain control signal CGS may have an active level (e.g., a first logic level). Thus, the gain control transistor DRG may be turned on, and the second floating diffusion node FD2 may be connected to the third floating diffusion node FD3 to increase a total capacitance of the second and third floating diffusion nodes FD2 and FD3. The second photodiode LPD may generate a second pixel signal.

Furthermore, when the second photodiode LPD operates in the HCG mode during the readout period, the gain control signal CGS may have an inactive level (e.g., a second logic level opposite to the first logic level). Thus, the gain control transistor DRG is turned off, and the second floating diffusion node FD2 becomes disconnected from the third floating diffusion node FD3. The second photodiode LPD may generate a first pixel signal.

According to an example embodiment of the inventive concept, the first photodiode SPD may generate pixel signals corresponding to a dual conversion gain. For example, the first photodiode SPD may generate pixel signals corresponding to the dual conversion gain via the second switch transistor SW2.

For example, when the first photodiode SPD operates in the LCG mode during a readout period, the second switch signal SWS2 may have an active level. Accordingly, the second switch transistor SW1 may be turned on, and a capacitance may be increased. The first photodiode SPD may generate a fourth pixel signal.

Furthermore, when the first photodiode SPD operates in the HCG mode during the readout period, the second switch signal SWS2 may have an inactive level. Accordingly, the second switch transistor SW2 may be turned off. The first photodiode SPD may generate a third pixel signal.

CDS may be implemented by separately storing an amount of reset charges and an amount of overflow charges in the second capacitor C2 and separately reading out the amount of reset charges and the amount of overflow charges stored in the second capacitor C2.

Figure 3:
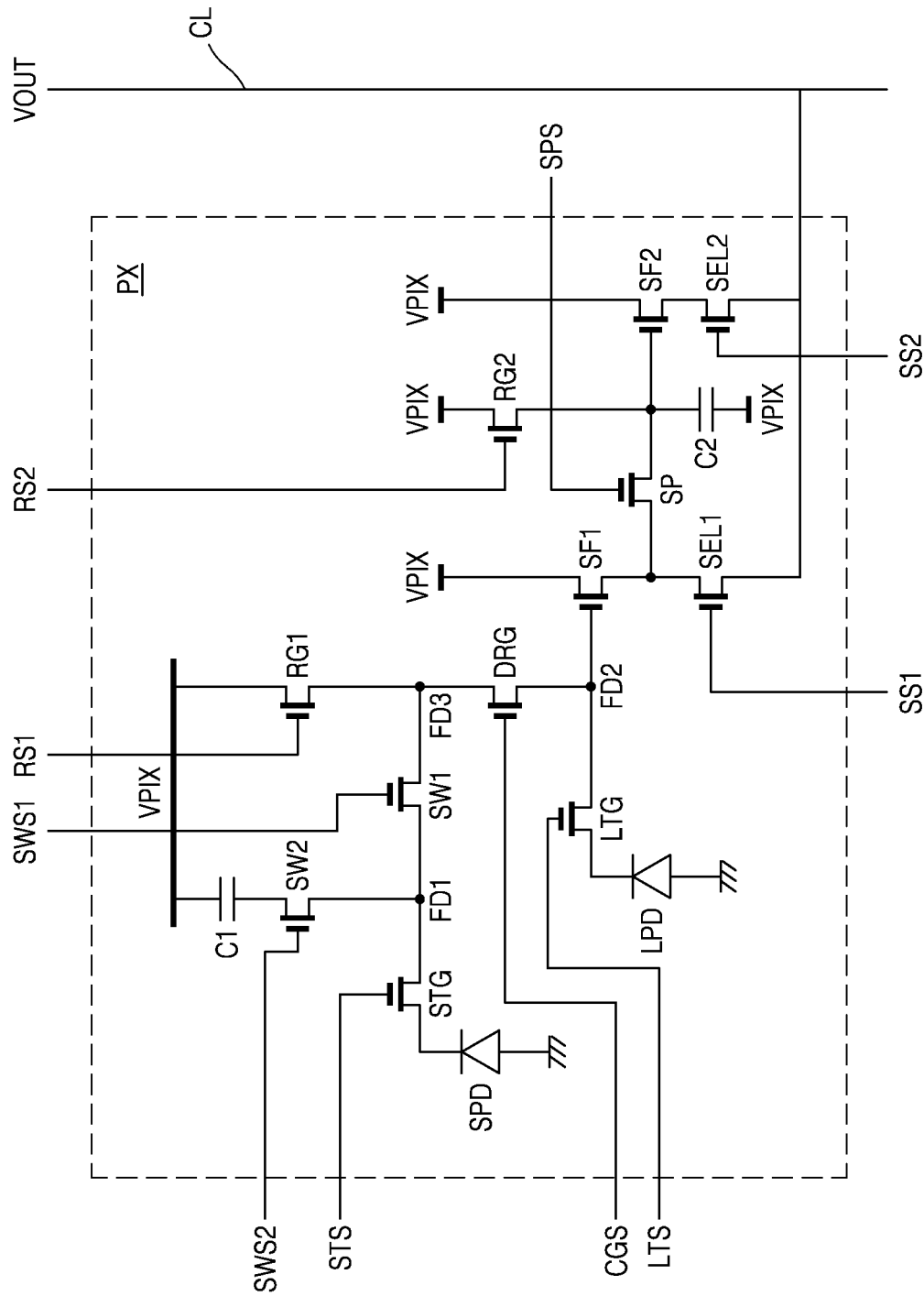
FIG. 3 is a circuit diagram of a pixel according to an example embodiment of the inventive concept.

FIG. 3 is a circuit diagram of a pixel PX according to an example embodiment of the inventive concept. FIG. 3 is a circuit diagram of the pixel PX of FIG. 1 according to an example embodiment of the inventive concept. Descriptions already provided above with respect to FIG. 2 are omitted below.

Referring to FIGS. 1 and 3, the pixel PX may include a plurality of photodiodes, e.g., a first photodiode SPD and a second photodiode LPD. The pixel PX may include a plurality of transistors, e.g., first and second transfer transistors STG and LTG, first and second reset transistors RG1 and RG2, first and second driving transistors SF1 and SF2, first and second select transistors SEL1 and SEL2, a gain control transistor DRG, first and second switch transistors SW1 and SW2, a sample transistor SP, and first and second capacitors C1 and C2.

The pixel PX may include the second driving transistor SF2. The second driving transistor SF2 may have a first terminal connected to the second select transistor SEL2 and a second terminal to which a driving voltage (e.g., a pixel voltage VPIX) may be applied. The second driving transistor SF2 may output, as a pixel signal VOUT, a voltage corresponding to an amount of charges stored in the second capacitor C2. The second driving transistor SF2 may stabilize pixel signals VOUT output to a column line CL.

The pixel PX may include the sample transistor SP. The sample transistor SP may have a first terminal connected to the first driving transistor SF1 and the first select transistor SEL1 and a second terminal connected to the second capacitor C2, the second reset transistor RG2, and the second driving transistor SF2.

The pixel PX may include the second select transistor SEL2. The second select transistor SEL2 may have a first terminal connected to the second driving transistor SF2 and a second terminal connected to the column line CL.

Different from the pixel of FIG. 2, the pixel in FIG. 3 additionally includes the second driving transistor SF2 having a gate terminal connected to the second capacitor, a first non-gate terminal receiving a pixel voltage VPIX, and a second non-gate terminal connected to the second select transistor SEL2. Further, different from the pixel of FIG. 2, the second select transistor SEL2 in the pixel of FIG. 3 is not connected to the second capacitor C2.

Figure 4:
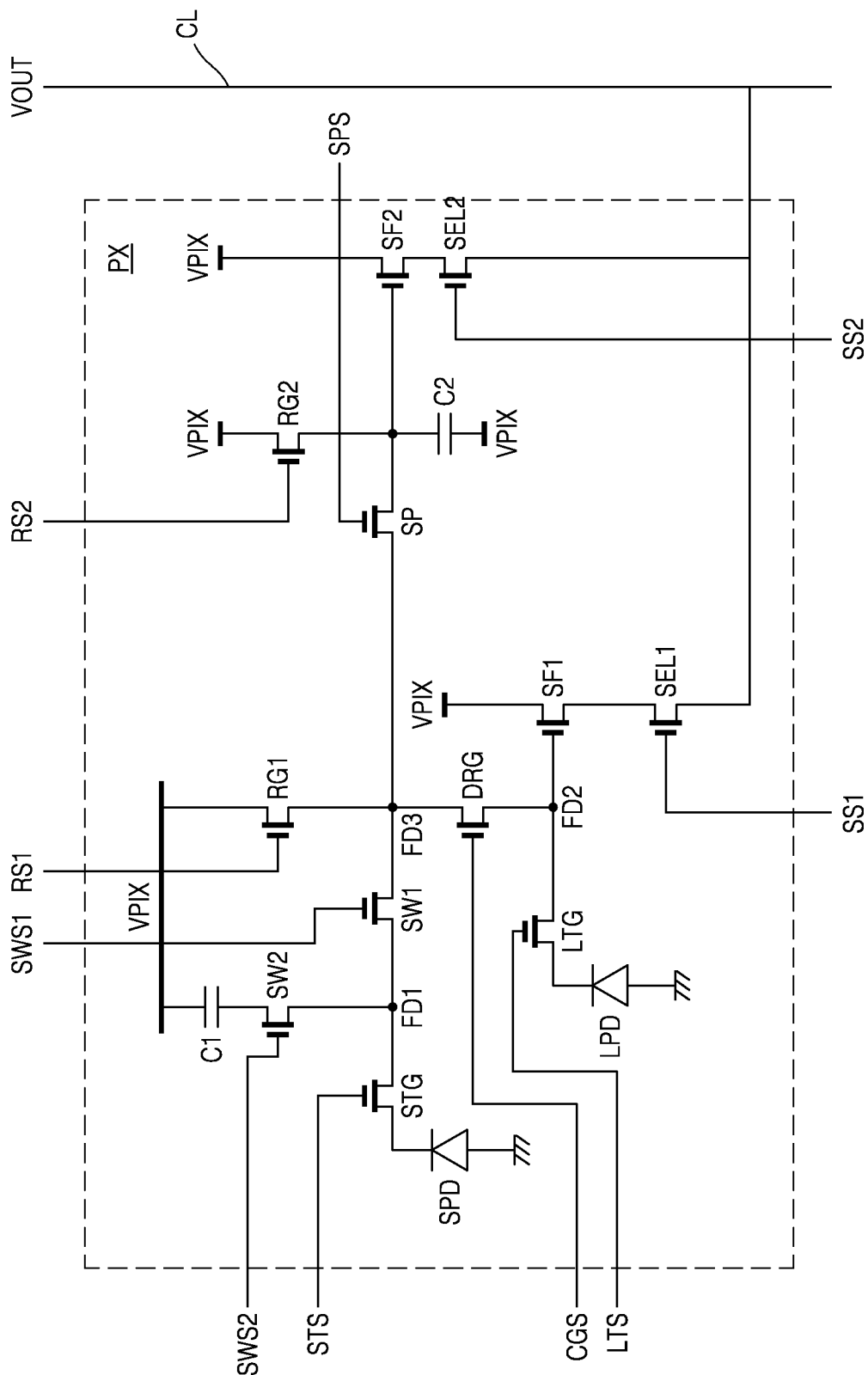
FIG. 4 is a circuit diagram of a pixel according to an example embodiment of the inventive concept.

FIG. 4 is a circuit diagram of a pixel according to an example embodiment of the inventive concept. In detail, FIG. 4 is a circuit diagram of the pixel PX of FIG. 1 according to an example embodiment of the inventive concept. Descriptions already provided above with respect to FIGS. 2 and 3 are omitted below.

Referring to FIGS. 1 and 4, the pixel PX may include a plurality of photodiodes, e.g., a first photodiode SPD and a second photodiode LPD. The pixel PX may include a plurality of transistors, e.g., first and second transfer transistors STG and LTG, first and second reset transistors RG1 and RG2, first and second driving transistors SF1 and SF2, first and second select transistors SEL1 and SEL2, a gain control transistor DRG, first and second switch transistors SW1 and SW2, a sample transistor SP, and first and second capacitors C1 and C2.

The pixel PX may include the sample transistor SP. The sample transistor SP may have a first terminal connected to a third floating diffusion node FD3 and a second terminal connected to the second capacitor C2, the second reset transistor RG2, and the second select transistor SEL2. The sample transistor SP may be turned on or off in response to a sample control signal SPS received from the row driver 120, and control connection between the third floating diffusion node FD3 and the second capacitor C2. The sample transistor SP may control the amount of overflow charges and the amount of reset charges to be stored in the second capacitor C2.

A second floating diffusion node FD2 may be connected to correspond to the first driving transistor SF1, and the third floating diffusion node FD3 may be connected to correspond to the second driving transistor SF2, thereby increasing the degrees of freedom in designing.

Unlike a non-gate terminal of the sample transistor SP in the pixel of FIG. 3 that is connected to a node between non-gate terminals of the first driving transistor SF1 and the first select transistor SEL1, the non-gate terminal of the sample transistor SP in the pixel of FIG. 4 is connected to the third floating diffusion node FD3.

Figure 5:
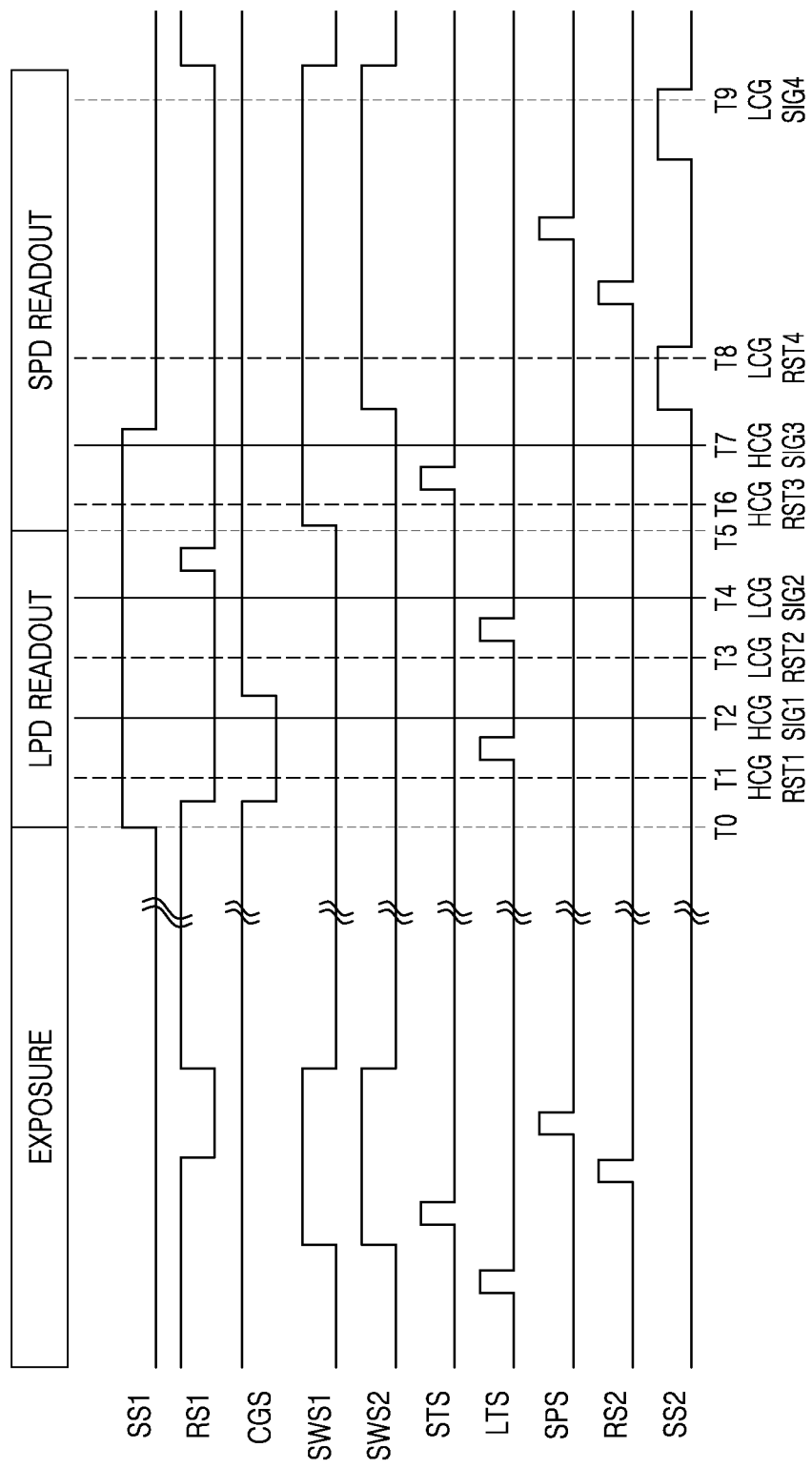
FIG. 5 is a timing diagram for explaining an operation of a pixel according to an example embodiment of the inventive concept.

FIG. 5 is a timing diagram for explaining an operation of a pixel according to an example embodiment of the inventive concept. In detail, FIG. 5 is a timing diagram illustrating an operation of the pixel PX of FIGS. 2 through 4, according to an example embodiment of the inventive concept. Hereinafter, although an operation of the pixel PX of FIG. 2 is described with reference to FIG. 5, an operation of the pixel PX of FIGS. 3 and 4 may also be described with reference to FIG. 5.

Referring to FIG. 5, during an exposure period, the pixel PX may reset a first photodiode SPD, a second photodiode LPD, and first through third floating diffusion nodes FD1 through FD3, and the first photodiode SPD and the second photodiode LPD may receive an optical signal to generate and accumulate photocharges. Furthermore, pixel signals corresponding to the second photodiode LPD may be read out during a first readout period LPD READOUT that is a readout period of the second photodiode LPD. Pixel signals corresponding to the first photodiode SPD may be read out during a second readout period SPD READOUT that is a readout period of the first photodiode SPD. Hereinafter, operations performed during the exposure period, the first readout period LPD READOUT, and the second readout period SPD READOUT are described.

First, in the exposure period, the first and second selection signals SS1 and SS2 may maintain a logic low level, and the first reset control signal RS1 may transition from a logic low level to a logic high level. Accordingly, the first reset transistor RG1 may be turned on, and the third floating diffusion node FD3 may be reset. The gain control signal CGS may transition from a logic low level to a logic high level to maintain the logic high level, and the conversion gain transistor DRG may be turned on. The second floating diffusion node FD2 may be connected to the third floating diffusion node FD3, and the second floating diffusion node FD2 may be reset.

The second transfer control signal LTS may transition from a logic low level to a logic high level after the first reset control signal RS1 and the gain control signal CGS transition from a logic low level to a logic high level. Accordingly, the second transfer transistor LTG may be turned on, and the second photodiode LPD may be reset.

The second transfer control signal LTS may transition from a logic high level to a logic low level, and the first and second switch signals SWS1 and SWS2 may transition from a logic low level to a logic high level. The first and second switch transistors SW1 and SW2 may be turned on. The first floating diffusion node FD1 may be connected to the third floating diffusion node FD3, and the first floating diffusion node FD1 and the first capacitor C1 may be reset.

After the first switch signal SWS1 and the second switch signal SWS2 transition from a logic low level to a logic high level, the first transfer control signal STS may transition from a logic low level to a logic high level. The first transfer transistor STG may be turned on, and the first photodiode SPD may be reset.

After the first transfer control signal STS and the second transfer control signal LTS transition from a logic high level to a logic low level, the first photodiode SPD and the second photodiode LPD may receive an optical signal and generate and accumulate photocharges corresponding to the optical signal.

When the first capacitor C1 is reset, the second reset control signal RS2 may transition from a logic low level to a logic high level. Accordingly, the second reset transistor RG2 may be turned on, and the second capacitor C2 may be reset.

The second reset control signal RS2 may transition from a logic high level to a logic low level, and the first reset control signal RS1 may transition from a logic high level to a logic low level. The sample control signal SPS may transition from a logic low level to a logic high level. Accordingly, the sample transistor SP may be turned on, and an amount of reset charges corresponding to a voltage of the first floating diffusion node FD1 may be stored in the second capacitor C2.

A readout period may start at start time T0. Pixel signals corresponding to the second photodiode LPD may be read out during the first readout period LPD READOUT, and pixel signals corresponding to the first photodiode SPD may be read out during the second readout period SPD READOUT. Hereinafter, operations performed during the first readout period LPD READOUT and the second readout period SPD READOUT are described.

First, in the first readout period LPD READOUT, the first selection signal SS1 may transition from a logic low level to a logic high level. After the start time T0, the first reset control signal RS1 and the gain control signal CGS may be at a logic high level, and accordingly, the second floating diffusion node FD2 may be reset. The first reset control signal RS1 may transition from the logic high level to a logic low level. The gain control signal CGS may transition from the logic high level to a logic low level. Accordingly, the first reset transistor RG1 and the gain control transistor DRG may be turned off, and because the second floating diffusion node FD2 is not connected to the third floating diffusion node FD3, the pixel PX may operate in the HCG mode. Then, a first reset signal HCG RST1 corresponding to the reset second floating diffusion node FD2 may be output through the column line CL. In other words, referring to FIG. 5, a first pixel signal output at first time T1 is the first reset signal HCG RST1 in the HCG mode of the second photodiode LPD. Because the first selection signal SS1 has a logic high level, the first select transistor SEL1 may be turned on, and the first reset signal HCG RST1 in the HCG mode of the second photodiode LPD may be output through the first select transistor SEL1.

After the first time T1, the second transfer control signal LTS may transition from a logic low level to a logic high level. Accordingly, the second transfer transistor LTG may be turned on, and charges generated by the second photodiode LPD may be transferred to and accumulated in the second floating diffusion node FD2 (accumulation operation). In this case, the gain control signal CGS may maintain a logic low level, and the pixel PX may operate in the HCG mode. Then, a first image signal HCG SIG1 corresponding to the second floating diffusion node FD2 where the accumulation occurs may be output through the column line CL. In other words, referring to FIG. 5, the first pixel signal output at second time T2 is the first image signal HCG SIG1 in the HCG mode of the second photodiode LPD. The first image signal HCG SIG1 in the HCG mode of the second photodiode LPD may be output through the first select transistor SEL1. The first pixel signal may include the first image signal HCG SIG1 and the first reset signal HCG RST1.

After the second time T2, the gain control signal CGS may transition from a logic low level to a logic high level. Accordingly, the gain control transistor DRG may be turned on, the second floating diffusion node FD2 may be connected to the third floating diffusion node FD3, and the pixel PX may operate in the LCG mode. Then, a second reset signal LCG RST2 corresponding to the second floating diffusion node FD2 may be output through the column line CL. In other words, referring to FIG. 5, a second pixel signal output at third time T3 is the second reset signal LCG RST2 in the LCG mode of the second photodiode LPD. The second reset signal LCG RST2 in the LCG mode of the second photodiode LPD may be output through the first select transistor SEL1.

After the third time T3, the second transfer control signal LTS may transition from a logic low level to a logic high level. Accordingly, the second transfer transistor LTG may be turned on, and charges generated by the second photodiode LPD may be transferred to and accumulated in the second floating diffusion node FD2. Then, a second image signal LCG SIG2 corresponding to the second floating diffusion node FD2 where the accumulation occurs may be output through the column line CL. In other words, referring to FIG. 5, the second pixel signal output at fourth time T4 is the second image signal LCG SIG2 in the LCG mode of the second photodiode LPD. The second image signal LCG SIG2 in the LCG mode of the second photodiode LPD may be output through the first select transistor SEL1. The second pixel signal may include the second image signal LCG SIG2 and the second reset signal LCG RST2.

After the fourth time T4, the first reset control signal RS1 may transition from a logic low level to a logic high level. In addition, the gain control signal CGS may maintain a logic high level. Accordingly, the first reset transistor RG1 and the gain control transistor DRG may be turned on, and the second and third floating diffusion nodes FD2 and FD3 may be reset. For example, referring to FIG. 5, charges remaining after the first and second pixel signals generated by the second photodiode LPD are output at fifth time T5 may be removed.

In the second readout period SPD READOUT, the gain control signal CGS may maintain a logic high level. In addition, the first switch signal SWS1 may transition from a logic low level to a logic high level. Accordingly, the first switch transistor SW1 may be turned on, the first floating diffusion node FD1 may be connected to the third floating diffusion node FD3, and the pixel PX may operate in the HCG mode. The first through third floating diffusion nodes FD1 through FD3 may be connected to one another, and a third reset signal HCG RST3 corresponding to the second floating diffusion node FD2 may be output through the column line CL. In other words, referring to FIG. 5, a third pixel signal output at sixth time T6 is the third reset signal HCG RST3 in the HCG mode of the first photodiode SPD. Because the first selection signal SS1 has a logic high level, the first select transistor SEL1 may be turned on, and the third reset signal HCG RST3 in the HCG mode of the first photodiode SPD may be output through the first select transistor SEL1.

After the sixth time T6, the first transfer control signal STS may transition from a logic low level to a logic high level. Accordingly, the first transfer transistor STG may be turned on, and charges generated by the first photodiode SPD may be transferred to and accumulated in the first floating diffusion node FD1. In addition, an image signal corresponding to the first floating diffusion node FD1 where the accumulation occurs may be output through the column line CL. In other words, referring to FIG. 5, the third pixel signal output at seventh time T7 is a third image signal HCG SIG3 in the HCG mode of the first photodiode SPD. The third image signal HCG SIG3 in the HCG mode of the first photodiode SPD may be output through the first select transistor SEL1. The third pixel signal may include the third image signal HCG SIG3 and the third reset signal HCG RST3.

After the seventh time T7, the second switch signal SWS2 may transition from a logic low level to a logic high level. The second switch transistor SW2 may be turned on, the first capacitor C1 may be connected to the first and third floating diffusion nodes FD1 and FD3, and the pixel PX may operate in the LCG mode. The second selection signal SS2 may transition from a logic low level to a logic high level. Accordingly, the second select transistor SEL2 may be turned on, and a fourth reset signal LCG RST4 corresponding to an amount of reset charges stored in the second capacitor C2 may be output through the second select transistor SEL2. The fourth reset signal LCG RST4 corresponding to the amount of reset charges stored in the second capacitor C2 during the exposure period may be output through the second select transistor SEL2. In other words, referring to FIG. 5, a fourth pixel signal output at eighth time T8 may be the fourth reset signal LCG RST4 in the LCG mode of the first photodiode SPD.

After the eighth time T8, the second reset control signal RS2 may transition from a logic low level to a logic high level. Accordingly, the second reset transistor RG2 may be turned on, and the second capacitor C2 may be reset. After the second capacitor C2 is reset, the sample control signal SPS may transition from a logic low level to a logic high level. Then, the sample transistor SP may be turned on, and an amount of overflow charges may be stored in the second capacitor C2. The first capacitor C1 may be connected to the first floating diffusion node FD1, and charges accumulated in the second and third floating diffusion nodes FD2 and FD3 may correspond to charges accumulated in the first capacitor C1. Charges that overflow from the first photodiode SPD due to an exposure operation may be accumulated in the first capacitor C1. In addition, an amount of charges corresponding to voltages of the first and second floating diffusion nodes FD1 and FD3 may be stored in the second capacitor C2.

The sample control signal SPS may transition from a logic high level to a logic low level while the second selection signal SS2 may transition from a logic low level to a logic high level. Accordingly, the sample transistor SP may be turned off, the second select transistor SEL2 may be turned on, and an amount of overflow charges stored in the second capacitor C2 may be output as a fourth image signal LCG SIG4 through the second select transistor SEL2. In other words, referring to FIG. 5, the fourth pixel signal output at ninth time T9 may be the fourth image signal LCG SIG4 in the LCG mode of the first photodiode SPD. The fourth pixel signal may include the fourth image signal LCG SIG4 and the fourth reset signal LCG RST4.

As described above, according to an example embodiment of the inventive concept, the pixel PX may store the fourth reset signal LCG RST4 and the fourth image signal LCG SIG4 in the second capacitor (C2 of FIG. 2) in the stated order, and read out the fourth reset signal LCG RST4 before the fourth image signal LCG SIG4 via the column line CL. Thus, a CDS technique may be applied, and pixel signals may be combined to produce an image having a wide dynamic range and an improved pixel signal-to-noise ratio (SNR).

Figure 6:
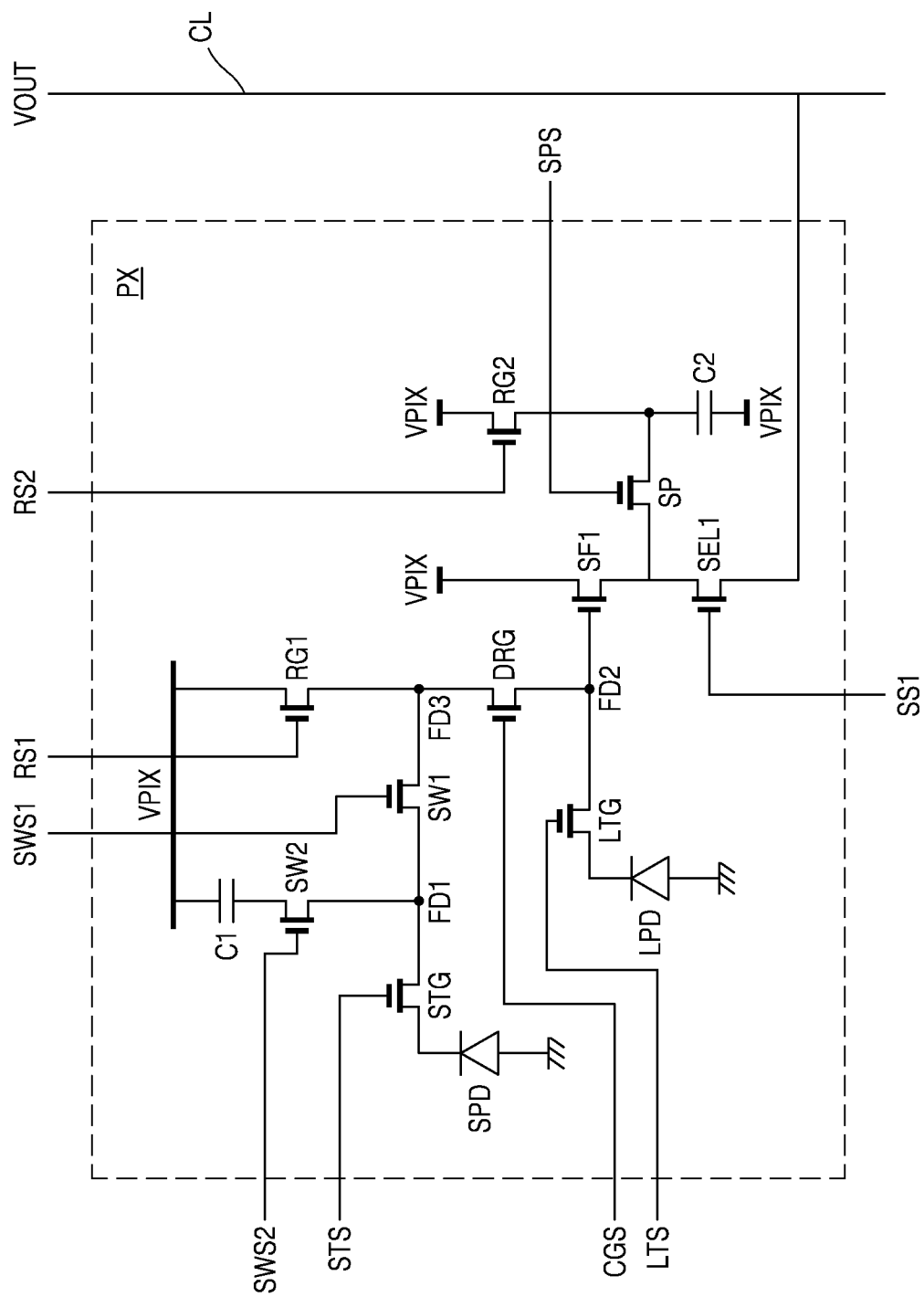
FIG. 6 is a circuit diagram of a pixel according to an example embodiment of the inventive concept.

FIG. 6 is a circuit diagram of the pixel PX of FIG. 1 according to an example embodiment of the inventive concept. Descriptions already provided above with respect to FIG. 2 are omitted below.

Referring to FIGS. 1 and 6, the pixel PX may include a plurality of photodiodes, e.g., a first photodiode SPD and a second photodiode LPD. The pixel PX may include a plurality of transistors, e.g., first and second transfer transistors STG and LTG, first and second reset transistors RG1 and RG2, a first driving transistor SF1, a first select transistor SEL1, a gain control transistor DRG, first and second switch transistors SW1 and SW2, a sample transistor SP, and first and second capacitors C1 and C2. Control signals, i.e., first and second transfer control signals STS and LTS, first and second reset control signals RS1 and RS2, first selection signal SS1, a gain control signal CGS, first and second switch signals SWS1 and SWS2, and a sample control signal SPS may be applied to the pixel PX, and at least some of them may be generated by the row driver 120. Unlike the pixels PX of FIGS. 2 through 4, the pixel PX of FIG. 6 does not include the second select transistor (e.g., the second select transistor SEL2 of FIG. 2).

The pixel PX may include the first select transistor SEL1. The first select transistor SEL1 may have a first terminal connected to the first driving transistor SF1 and a second terminal connected to a column line CL. When the first select transistor SEL1 is turned on during a readout operation, a pixel signal VOUT including a reset signal corresponding to a reset operation or an image signal corresponding to a charge accumulation operation may be output to the column line CL. For example, when the first select transistor SEL1 is turned on, an amount of overflow charges or an amount of reset charges may be output as a pixel signal VOUT.

The pixel PX may include the second capacitor C2. The second capacitor C2 may have a first terminal connected to the sample transistor SP and the second reset transistor RG2 and a second terminal to which a pixel voltage VPIX may be applied.

The pixel PX may include the second reset transistor RG2. The second reset transistor RG2 may have a first terminal to which a reset voltage (e.g., a pixel voltage VPIX) may be applied and a second terminal connected to the second capacitor C2 and the sample transistor SP.

The pixel PX may include the sample transistor SP. The sample transistor SP may have a first terminal connected to the first driving transistor SF1 and the first select transistor SEL1 and a second terminal connected to the second capacitor C2 and the second reset transistor RG2.

Different than the pixel of FIG. 2, the pixel of FIG. 6 does not include a second select transistor SEL2 connected between the second capacitor C2 and the first select transistor SEL1.

Figure 7:
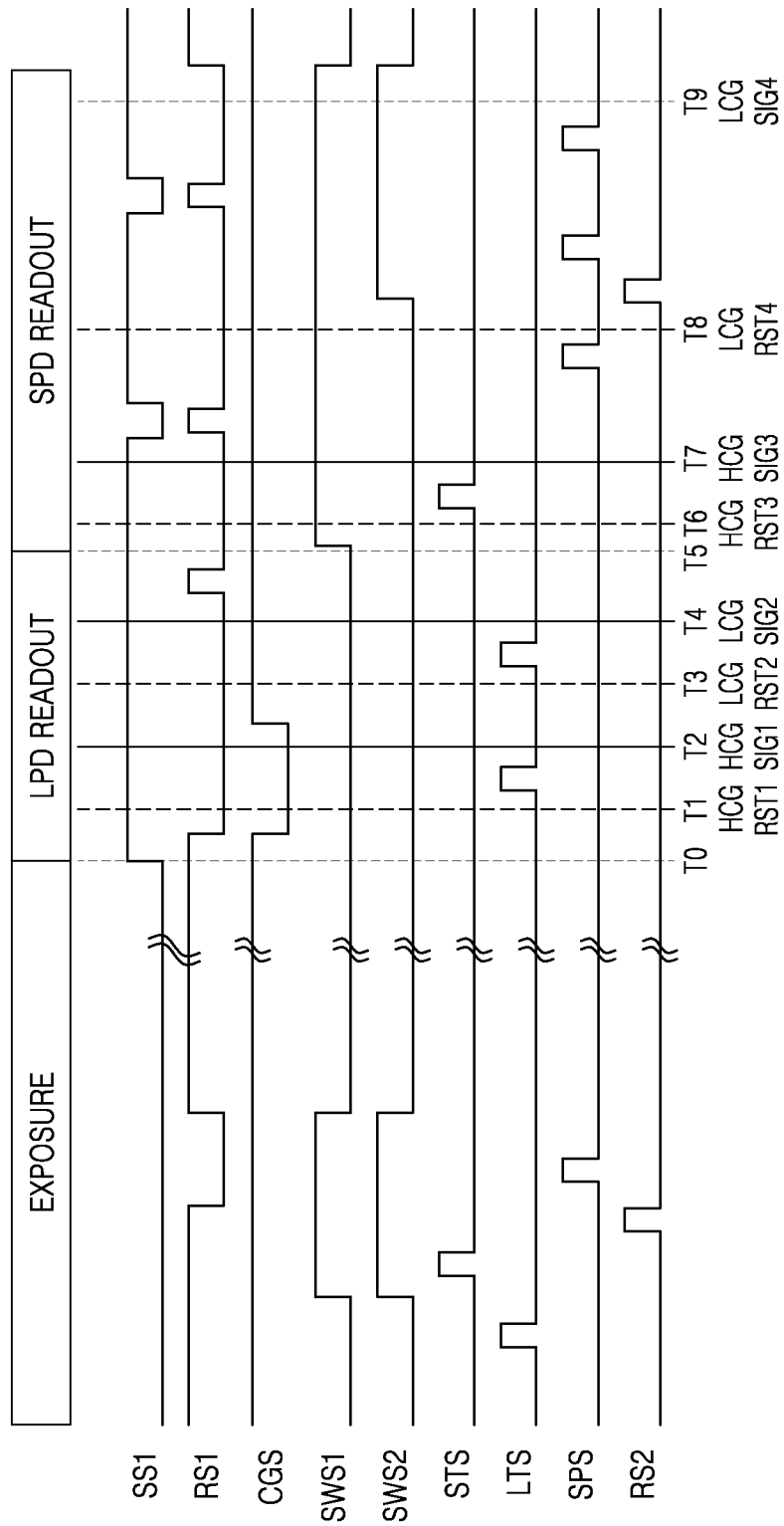
FIG. 7 is a timing diagram for explaining an operation of a pixel according to an example embodiment of the inventive concept.

FIG. 7 is a timing diagram for explaining an operation of a pixel according to an example embodiment of the inventive concept. In detail, FIG. 7 is a timing diagram illustrating an operation of the pixel PX of FIG. 6, according to an example embodiment of the inventive concept. Descriptions already provided above with respect to FIG. 5 are omitted below.

Referring to FIGS. 6 and 7, descriptions with respect to the operation during the exposure period of FIG. 5 may be applied equally to an operation performed during an exposure period of FIG. 7. Pixel signals corresponding to the second photodiode LPD may be read out during a first readout period LPD READOUT that is a readout period of the second photodiode LPD.

The first readout period LPD READOUT may start at start time T0. At first time T1, a first reset signal HCG RST1 in the HCG mode of the second photodiode LPD may be output as a first pixel signal. At second time T2, a first image signal HCG SIG1 in the HCG mode of the second photodiode LPD may be output as the first pixel signal. At third time T3, a second reset signal LCG RST2 in the LCG mode of the second photodiode LPD may be output as a second pixel signal. At fourth time T4, a second image signal LCG SIG2 in the LCG mode of the second photodiode LPD may be output as the second pixel signal. A second readout period SPD READOUT may start at fifth time T5.

During the second readout period SPD READOUT, the gain control signal CGS may maintain a logic high level. At a sixth time T6, a third reset signal HCG RST3 in the HCG mode of the first photodiode SPD may be output as a third pixel signal. At a seventh time T7, a third image signal HCG SIG3 in the HCG mode of the first photodiode SPD may be output as the third pixel signal.

After the seventh time T7, the first selection signal SS1 may transition from a logic high level to a logic low level while the first reset control signal RS1 may transition from a logic low level to a logic high level. The first select transistor SEL1 may be turned off, the first reset transistor RG1 may be turned on, and the first through third floating diffusion nodes FD1 through FD3 may be reset.

The first selection signal SS1 may transition back to the logic high level from the logic low level, and the first reset control signal RS1 may transition back to the logic low level from the logic high level. The sample control signal SPS may transition from a logic low level to a logic high level. Accordingly, the first select transistor SEL1 and the sample transistor SP may be turned on, and a fourth reset signal LCG RST4 corresponding to an amount of reset charges stored in the second capacitor C2 may be output as a fourth pixel signal via the first select transistor SEL1. The fourth reset signal LCG RST4 stored in the second capacitor C2 during the exposure period may be output through the first select transistor SEL1. In other words, referring to FIG. 7, the fourth pixel signal output at eighth time T8 may be the fourth reset signal LCG RST4 in the LCG mode of the first photodiode SPD.

After the eighth time T8, the second reset control signal RS2 may transition from a logic low level to a logic high level. Accordingly, the second reset transistor RG2 may be turned on, and the second capacitor C2 may be reset. After the second capacitor C2 is reset, the second switch signal SWS2 may transition from a logic low level to a logic high level, and the sample control signal SPS may transition from a logic low level to a logic high level. Accordingly, the second switch transistor SW2 and the sample transistor SP may be turned on, and an amount of overflow charges accumulated in the first capacitor C1 may be stored in the second capacitor C2. The first capacitor C1 may be connected to the first floating diffusion node FD1, and charges accumulated in the second and third floating diffusion nodes FD2 and FD3 may correspond to an amount of overflow charges accumulated in the first capacitor C1. Charges that overflow from the first photodiode SPD due to an exposure operation may be accumulated in the first capacitor C1. In addition, an amount of overflow charges corresponding to a voltage of the second floating diffusion node FD2 where accumulation occurs may be stored in the second capacitor C2.

The sample control signal SPS may transition from a logic low level to a logic high level while the first selection signal SS1 may transition from a logic high level to a logic low level, and the first reset control signal RS1 may transition from a logic low level to a logic high level. The first select transistor SEL1 may be turned off, the first reset transistor RG1 may be turned on, and the first through third floating diffusion nodes FD1 through FD3 may be reset. When the first through third floating diffusion nodes FD1 through FD3 are reset, the first selection signal SS1 may transition from a logic low level to a logic high level while the first reset control signal RS1 may transition from a logic high level to a logic low level.

The sample control signal SPS may transition from the logic low level to the logic high level. Accordingly, the sample transistor SP may be turned on, and an amount of overflow charges stored in the second capacitor C2 may be output as the fourth image signal LCG SIG4 via the first select transistor SEL1. In other words, referring to FIG. 7, the fourth pixel signal output at ninth time T9 may be the fourth image signal LCG SIG4 in the LCG mode of the first photodiode SPD.

Figure 8:
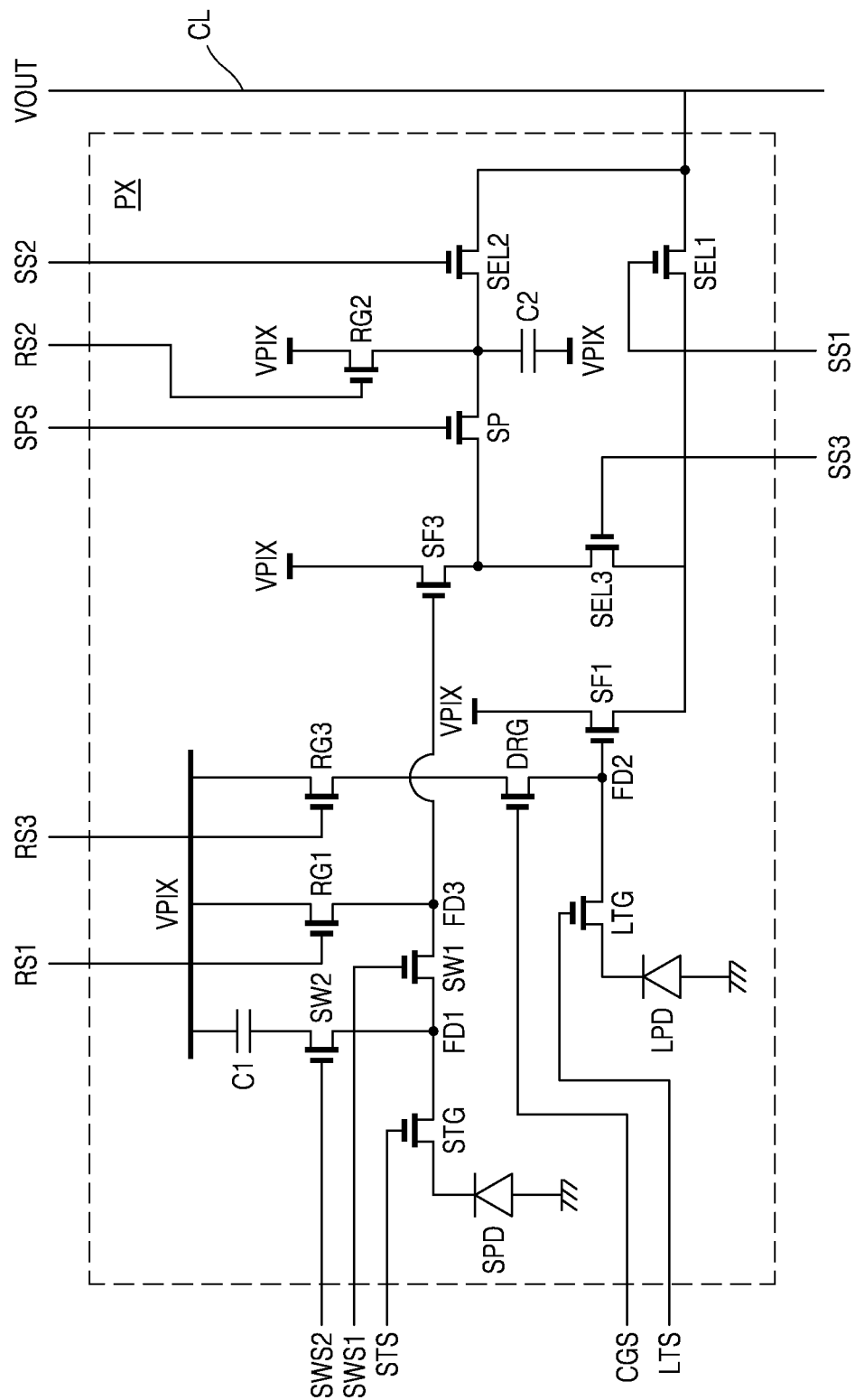
FIG. 8 is a circuit diagram of a pixel according to an example embodiment of the inventive concept.

FIG. 8 is a circuit diagram of a pixel according to an example embodiment of the inventive concept. In detail, FIG. 8 is a circuit diagram of the pixel PX of FIG. 1 according to an example embodiment of the inventive concept. Descriptions already provided above with respect to FIG. 2 are omitted below.

Referring to FIGS. 1 and 8, the pixel PX may include a plurality of photodiodes, e.g., a first photodiode SPD and a second photodiode LPD. The pixel PX may include a plurality of transistors, e.g., first and second transfer transistors STG and LTG, first through third reset transistors RG1 through RG3, first and third driving transistors SF1 and SF3, first through third select transistors SEL1 through SEL3, a gain control transistor DRG, first and second switch transistors SW1 and SW2, a sample transistor SP, and first and second capacitors C1 and C2. Control signals, i.e., first and second transfer control signals STS and LTS, first through third reset control signals RS1 through RS3, first through third selection signals SS1 through SS3, a gain control signal CGS, first and second switch signals SWS1 and SWS2, and a sample control signal SPS may be applied to the pixel PX, and at least some of them may be generated by the row driver 120.

The pixel PX may include the first reset transistor RG1. The first reset transistor RG1 may reset charges accumulated in the third floating diffusion node FD3. When the first switch transistor SW1 is turned on to connect the first floating diffusion node FD1 to the third floating diffusion node FD3, charges accumulated in the first floating diffusion node FD1 may be drained out to reset the floating diffusion node FD1.

The pixel PX may include the third driving transistor SF3. The third driving transistor SF3 may have a first terminal connected to the third floating diffusion node FD3 and a second terminal to which a driving voltage (e.g., a pixel voltage VPIX) may be applied. The third driving transistor SF3 may output a voltage corresponding to charges accumulated in the third floating diffusion node FD3 as an output signal. In other words, the third driving transistor SF3 may generate an output signal corresponding to a voltage of the third floating diffusion node FD3.

The pixel PX may include the sample transistor SP. The sample transistor SP may have a first terminal connected to the third driving transistor SF3 and the third select transistor SEL3 and a second terminal connected to the second capacitor C2, the second reset transistor RG2, and the second select transistor SEL2. The sample transistor SP may control connection between the third driving transistor SF3 and the second capacitor C2. The sample transistor SP may control an amount of overflow charges and an amount of reset charges to be stored in the second capacitor C2. The sample transistor SP may be turned on so that an amount of reset charges and an amount of overflow charges from the third floating diffusion node FD3 are stored in the second capacitor C2.

The pixel PX may include the third select transistor SEL3. The third select transistor SEL3 may have a first terminal connected to the third driving transistor SF3 and a second terminal connected to the first select transistor SEL1. The third select transistor SEL3 may be turned on or off in response to the second selection signal SS3 received from the row driver 120. When the third select transistor SEL3 is turned on during a readout operation, an output signal corresponding to the voltage of the third floating diffusion node FD3 may be output to the column line CL as a pixel signal. Charges generated by the first photodiode SPD may be accumulated in the first floating diffusion node FD1, and when the third and first select transistors SEL3 and SEL1 are turned on, an output signal corresponding to a voltage of the first floating diffusion node FD1 may be output to the column line CL as a pixel signal.

The pixel PX may include the third reset transistor RG3. The third reset transistor RG3 may reset charges accumulated in the second floating diffusion node FD2. The third reset transistor RG3 may have a first terminal to which a reset voltage (e.g., a pixel voltage VPIX) may be applied and a second terminal connected to the gain control transistor DRG. The third reset transistor RG3 may be turned on or off in response to the third reset control signal RS3 received from the row driver 120, and charges accumulated in the second floating diffusion node FD2 may be drained out to reset the second floating diffusion node FD2.

The pixel PX may include the conversion gain transistor DRG. The gain control transistor DRG may have a first terminal connected to the third reset transistor RG3 and a second terminal connected to the second floating diffusion node FD2.

The pixel PX may include the first driving transistor SF1. The first driving transistor SF1 may output a voltage corresponding to charges accumulated in the second floating diffusion node FD2 as an output signal.

According to an example embodiment of the inventive concept, the second photodiode LPD may generate pixel signals corresponding to a dual conversion gain via the gain control transistor DRG. For example, when the second photodiode LPD operates in the LCG mode during a readout period, the gain control signal CGS may have an active level. Furthermore, when the second photodiode LPD operates in the HCG mode during the readout period, the gain control signal CGS may have an inactive level. Furthermore, according to an example embodiment of the inventive concept, the first photodiode SPD may generate pixel signals corresponding to a dual conversion gain.

Figure 9:
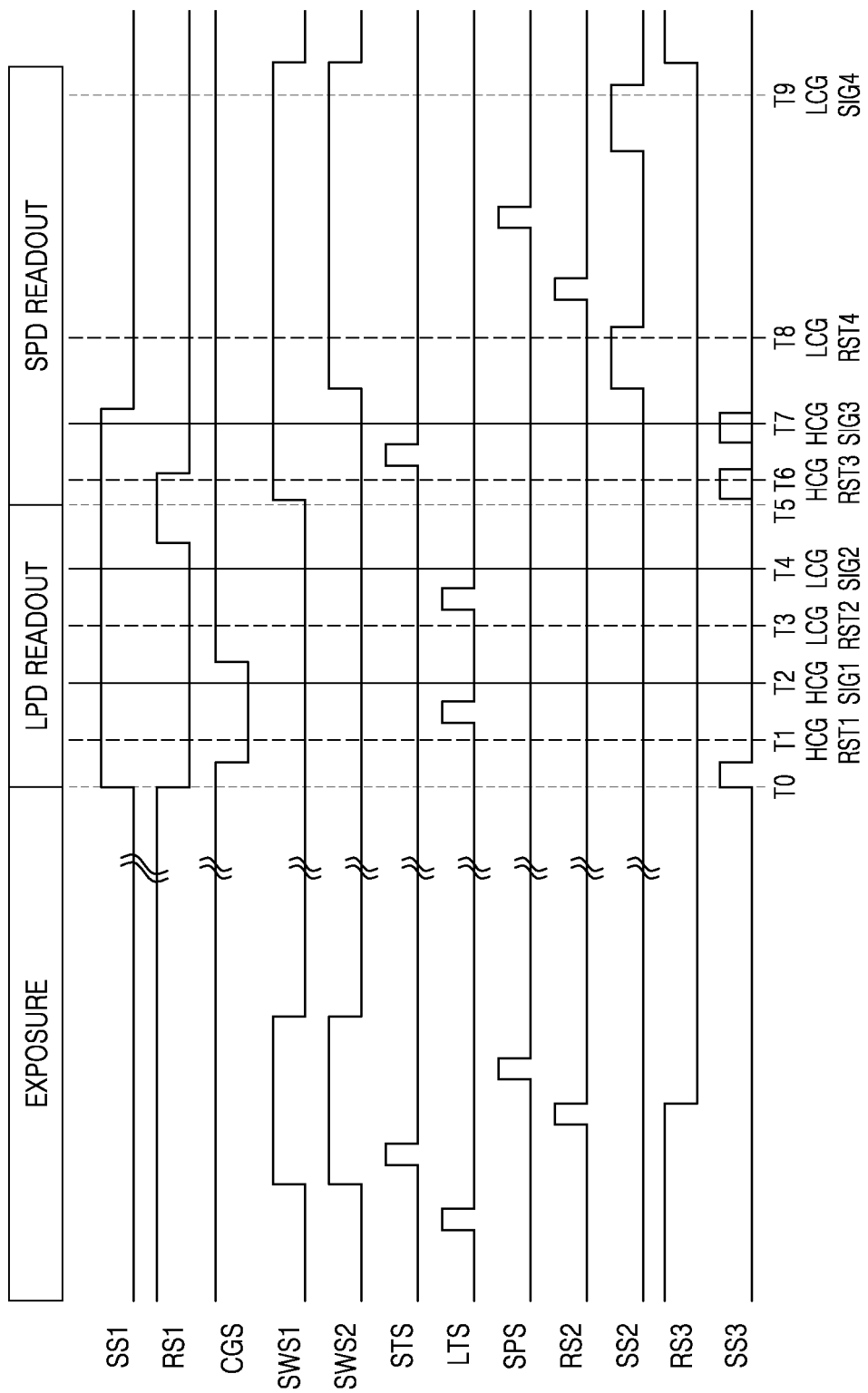
FIG. 9 is a timing diagram for explaining an operation of a pixel according to an example embodiment of the inventive concept.

FIG. 9 is a timing diagram for explaining an operation of a pixel according to an example embodiment of the inventive concept. FIG. 9 is a timing diagram illustrating an operation of the pixel PX of FIG. 8, according to an example embodiment of the inventive concept. Descriptions already provided above with respect to FIG. 5 are omitted below.

Referring to FIGS. 8 and 9, during an exposure period, the pixel PX may reset the first photodiode SPD, the second photodiode LPD, and the first through third floating diffusion nodes FD1 through FD3, and the first photodiode SPD and the second photodiode LPD may receive an optical signal to generate and accumulate photocharges. Furthermore, pixel signals corresponding to the second photodiode LPD may be read out during a first readout period LPD READOUT that is a readout period of the second photodiode LPD. Pixel signals corresponding to the first photodiode SPD may be read out during a second readout period SPD READOUT that is a readout period of the first photodiode SPD.

First, during the exposure period, the first through third selection signals SS1 through SS3 may maintain a logic low level, and the first reset control signal RS1 may transition from a logic low level to a logic high level. Accordingly, the first reset transistor RG1 may be turned on, and the third floating diffusion node FD3 may be reset. Furthermore, as the first switch signal SWS1 and the second transfer control signal STS transition to a logic high level, the first floating diffusion node FD1 and the first photodiode SPD may also be reset, and when the second transfer control signal STS transitions back to a logic low level, photocharges generated by the first photodiode SPD may be accumulated in the first photodiode SPD.

The third reset control signal RS3 and the gain control signal CGS may transition from a logic low level to a logic high level, and the third reset transistor RG3 and the gain control transistor DRG may be turned on. The second floating diffusion node FD2 may be reset. Furthermore, as the second transfer control signal LTS also transitions to a logic high level, the second photodiode LPD may be reset together with the second floating diffusion node FD2, and when second transfer control signal LTS transitions back to a logic low level, photocharges generated by the second photodiode LPD may be accumulated in the second photodiode LPD.

A readout period may start at start time T0. First, during the first readout period LPD READOUT, the first selection signal SS1 may transition from a logic low level to a logic high level. The first reset control signal RS1 may transition from a logic low level to a logic high level. The gain control signal CGS may be at a logic high level when the third reset control signal RS3 is at the logic high level. Accordingly, the second floating diffusion node FD2 may be reset.

When the gain control signal CGS transitions from a logic high level to a logic low level, the gain control transistor DRG may be turned off, and because the second floating diffusion node FD2 is not connected to the third floating diffusion node FD3, the pixel PX may operate in the HCG mode. In addition, a first reset signal HCG RST1 corresponding to a voltage of the second floating diffusion node FD2 may be output through the column line CL. In other words, referring to FIG. 9, a first pixel signal output at first time T1 is the first reset signal HCG RST1 in the HCG mode of the second photodiode LPD. Because the first selection signal SS1 has a logic high level, the first select transistor SEL1 may be turned on, and the first reset signal HCG RST1 in the HCG mode of the second photodiode LPD may be output through the first select transistor SEL1.

The first pixel signal output at second time T2 is a first image signal HCG SIG1 in the HCG mode of the second photodiode LPD. The first image signal HCG SIG1 in the HCG mode of the second photodiode LPD may be output through the first select transistor SEL1.

After the second time T2, the gain control signal CGS may transition from a logic low level to a logic high level. Accordingly, the gain control transistor DRG may be turned on, the second floating diffusion node FD2 may be connected to the third reset transistor RG3, and the pixel PX may operate in the LCG mode. Furthermore, a second reset signal LCG RST2 corresponding to the second floating diffusion node FD2 may be output through the column line CL. In other words, referring to FIG. 9, a second pixel signal output at a third time T3 is the second reset signal LCG RST2 in the LCG mode of the second photodiode LPD. The second reset signal LCG RST2 in the LCG mode of the second photodiode LPD may be output through the first select transistor SEL1.

After the third time T3, the second transfer control signal LTS may transition from a logic low level to a logic high level. Accordingly, the second transfer transistor LTG may be turned on, and charges generated by the second photodiode LPD may be transferred to and accumulated in the second floating diffusion node FD2. Then, a second image signal LCG SIG2 corresponding to the second floating diffusion node FD2 where the accumulation occurs may be output through the column line CL. In other words, referring to FIG. 9, the second pixel signal output at fourth time T4 is the second image signal LCG SIG2 in the LCG mode of the second photodiode LPD. The second image signal LCG SIG2 in the LCG mode of the second photodiode LPD may be output through the first select transistor SEL1.

After the fourth time T4, the first reset control signal RS1 may transition from a logic low level to a logic high level. In addition, the gain control signal CGS may maintain a logic high level. Accordingly, the first reset transistor RG1 and the gain control transistor DRG may be turned on, and the third floating diffusion node FD3 may be reset.

During the second readout period SPD READOUT, the gain control signal CGS may maintain a logic high level. In addition, the first switch signal SWS1 may transition from a logic low level to a logic high level. Accordingly, the first switch transistor SW1 may be turned on, the first floating diffusion node FD1 may be connected to the third floating diffusion node FD3, and the pixel PX may operate in the HCG mode. Because the first reset control signal RS1 is at a logic high level, the first and third floating diffusion nodes FD1 and FD3 may be reset.

After the first switch signal SWS1 transitions from a logic low level to a logic high level, the third selection signal SS3 may transition from a logic low level to a logic high level. Because the first selection signal SS1 is also at a logic high level, the first and third select transistors SEL1 and SEL3 may be turned on, and a third reset signal HCG RST3 corresponding to the third floating diffusion node FD3 may be output through the column line CL. In other words, referring to FIG. 9, a third pixel signal output at sixth time T6 is the third reset signal HCG RST3 in the HCG mode of the first photodiode SPD. The third reset signal HCG RST3 in the HCG mode of the first photodiode SPD may be output through the third and first select transistors SEL3 and SEL1.

After the sixth time T6, the first transfer control signal STS may transition from a logic low level to a logic high level. Accordingly, the first transfer transistor STG may be turned on, and charges generated by the first photodiode SPD may be transferred to and accumulated in the first floating diffusion node FD1. The third selection signal SS3 may transition from a logic low level to a logic high level.

Because the first selection signal SS1 is also at a logic high level, the first and third select transistors SEL1 and SEL3 may be turned on, and a third image signal HCG SIG3 corresponding to the first floating diffusion node FD1 where the charges are accumulated may be output through the column line CL. In other words, referring to FIG. 9, the third pixel signal output at seventh time T7 is the third image signal HCG SIG3 in the HCG mode of the first photodiode SPD. The third reset signal HCG SIG3 in the HCG mode of the first photodiode SPD may be output through the third and first select transistors SEL3 and SEL1.

After the seventh time T7, the second switch signal SWS2 may transition from a logic low level to a logic high level. The second switch transistor SW2 may be turned on, the first capacitor C1 may be connected to the first and third floating diffusion nodes FD1 and FD3, and the pixel PX may operate in the LCG mode. The second selection signal SS2 may transition from a logic low level to a logic high level. Accordingly, the second select transistor SEL2 may be turned on, and a fourth reset signal LCG RST4 corresponding to an amount of reset charges stored in the second capacitor C2 may be output through the second select transistor SEL2. The fourth reset signal LCG RST4 corresponding to the amount of reset charges stored in the second capacitor C2 during the exposure period may be output through the second select transistor SEL2. In other words, referring to FIG. 9, a fourth pixel signal output at eighth time T8 may be the fourth reset signal LCG RST4 in the LCG mode of the first photodiode SPD.

After the eighth time T8, the second reset control signal RS2 may transition from a logic low level to a logic high level. Accordingly, the second reset transistor RG2 may be turned on, and the second capacitor C2 may be reset. After the second capacitor C2 is reset, the sample control signal SPS may transition from a logic low level to a logic high level. Then, the sample transistor SP may be turned on, and an amount of overflow charges may be stored in the second capacitor C2. In detail, the first capacitor C1 may be connected to the first floating diffusion node FD1, and charges accumulated in the first and third floating diffusion nodes FD1 and FD3 may correspond to charges accumulated in the first capacitor C1. Charges that overflow from the first photodiode SPD due to an exposure operation may be accumulated in the first capacitor C1. In addition, an amount of overflow charges corresponding to voltages of the first and third floating diffusion node FD1 and FD3 may be stored in the second capacitor C2.

The sample control signal SPS may transition from a logic high level to a logic low level while the second selection signal SS2 may transition from a logic low level to a logic high level. Accordingly, the sample transistor SP may be turned off while the second select transistor SEL2 may be turned on, and an amount of overflow charges stored in the second capacitor C2 may be output as a fourth image signal LCG SIG4 via the second select transistor SEL2. In other words, referring to FIG. 9, the fourth pixel signal output at ninth time T9 may be the fourth image signal LCG SIG4 in the LCG mode of the first photodiode SPD.

Because the fourth reset signal LCG RST4 in the LCG mode of the first photodiode SPD is output at the eighth time T8, and the fourth image signal LCG SIG4 in the LCG mode of the first photodiode SPD is output at the ninth time T9, a CDS technique may be used. Thus, a dynamic range of an image sensor may be increased, and an SNR may be improved.

Figure 10:
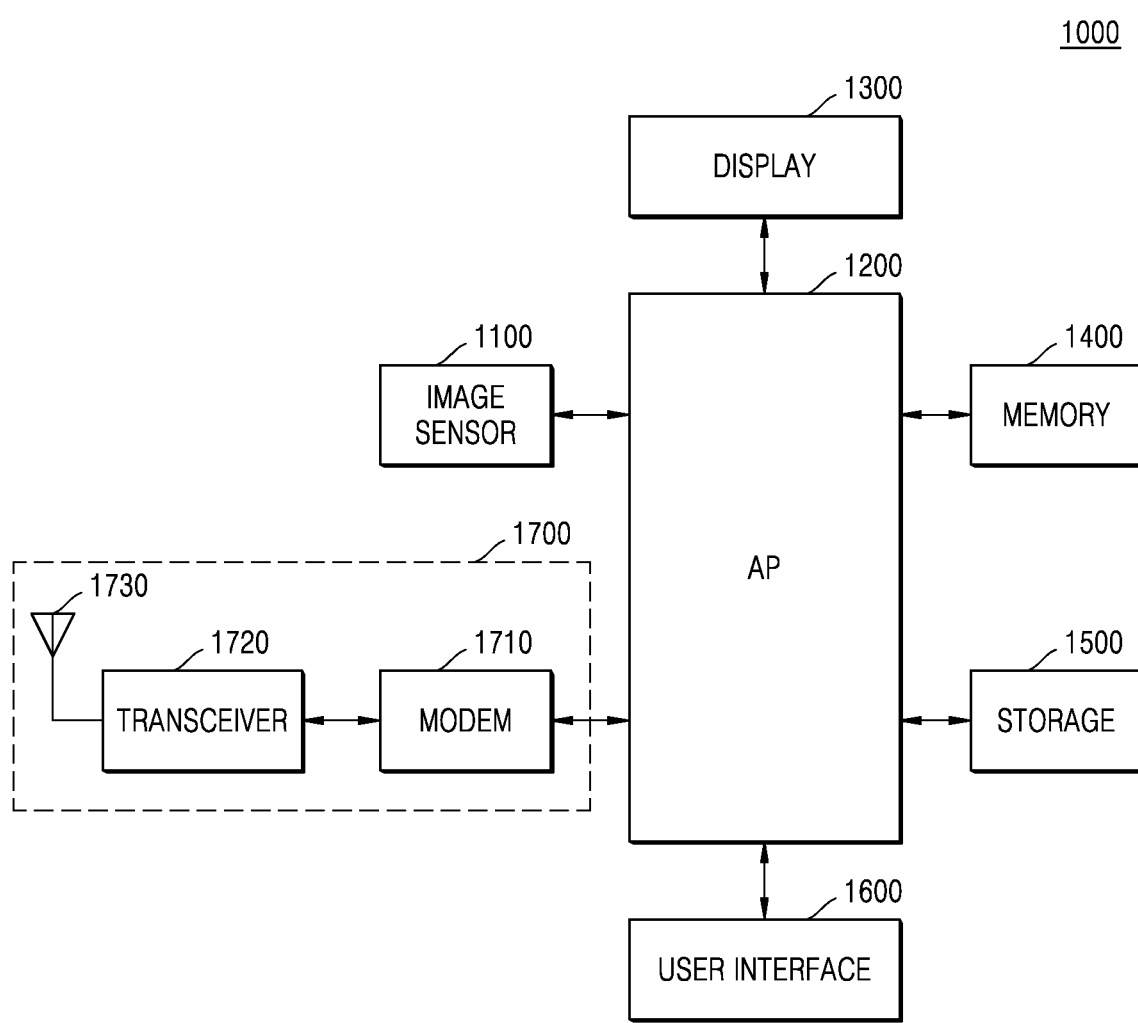
FIG. 10 is a block diagram of an electronic device according to an example embodiment of the inventive concept.

FIG. 10 is a block diagram of an electronic device 1000 according to an example embodiment of the inventive concept.

Referring to FIG. 10, the electronic device 1000 may include an image sensor 1100, an application processor (AP) 1200, a display 1300, a memory 1400, a storage 1500, a user interface 1600, and a wireless transceiver 1700. The image sensor 1100 of FIG. 10 may correspond to the image sensor 100 of FIG. 1. Descriptions already provided above with respect to FIG. 1 are omitted below.

The AP 1200 may be provided as a system-on-chip (SoC) that controls all operations of the electronic device 1000 and runs application programs, an operating system, etc. The AP 1200 may receive image data from the image sensor 1100 and perform image processing on the received image data. In some embodiments, the AP 1200 may store the received image data and/or the processed image data in the memory 1400 or the storage 1500. The image sensor 100 of FIG. 1 may be used to implement the image sensor 1100.

The memory 1400 may store programs and/or data processed or executed by the AP 1200. The storage 1500 may be implemented as a non-volatile memory device such as a NAND flash, a resistive memory, or the like, and for example, the storage 1500 may be provided as a memory card (multimedia card (MMC), embedded MMC (eMMC), secure digital (SD), and micro SD) or the like. The storage 1500 may store data and/or programs for an execution algorithm that controls an image processing operation of the AP 1200, and the data and/or programs may be loaded into the memory 1400 when the image processing operation is performed.

The user interface 1600 may be implemented as various devices capable of receiving a user input, such as a keyboard, a touch panel, a fingerprint sensor, a microphone, etc. The user interface 1600 may receive a user input and provide a signal corresponding to the received user input to the AP 1200. The wireless transceiver 1700 may include a modem 1710, a transceiver 1720, and an antenna 1730.

Figure 11:
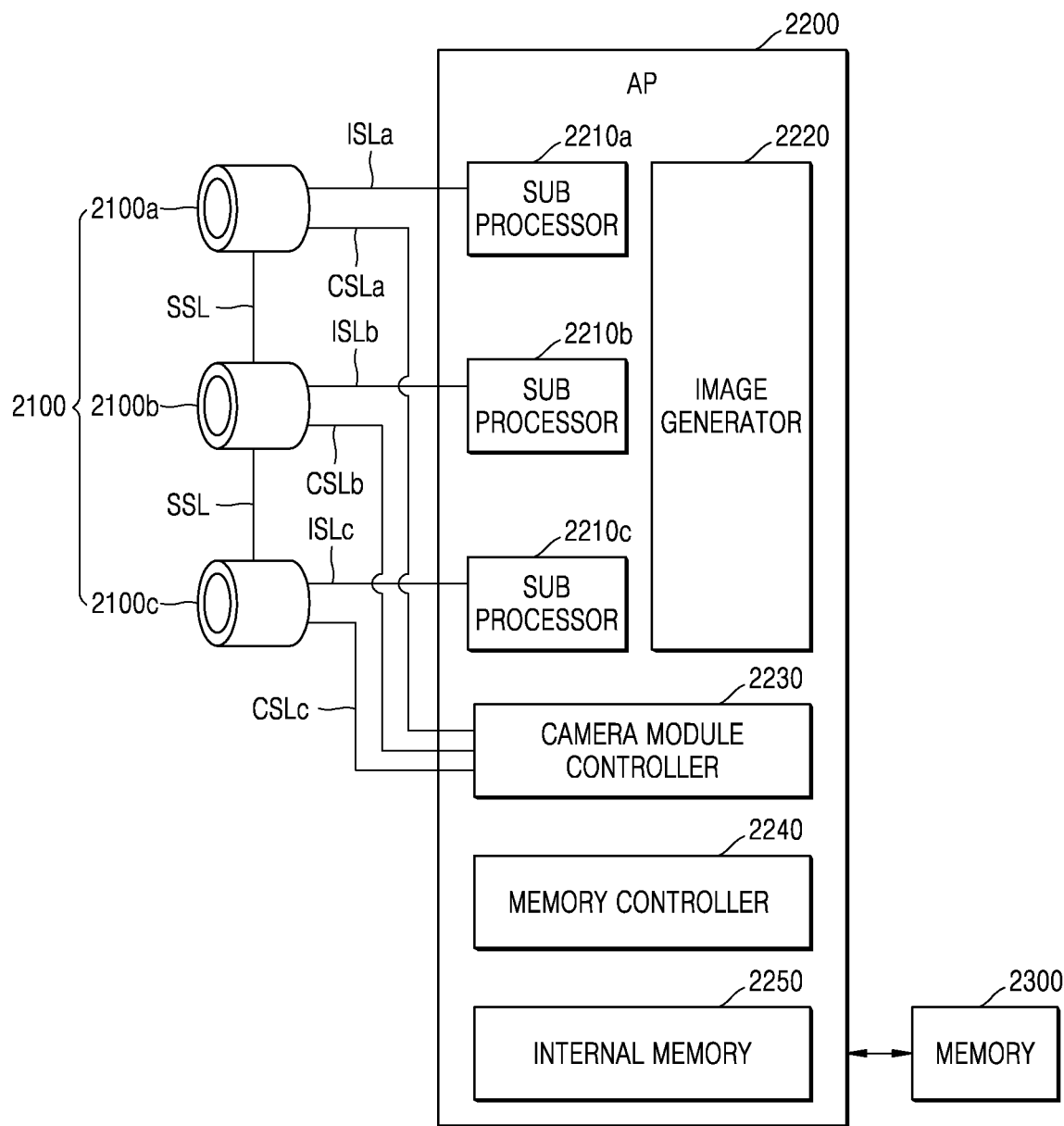
FIG. 11 is a block diagram of a part of an electronic device according to an example embodiment of the inventive concept.
Figure 12:
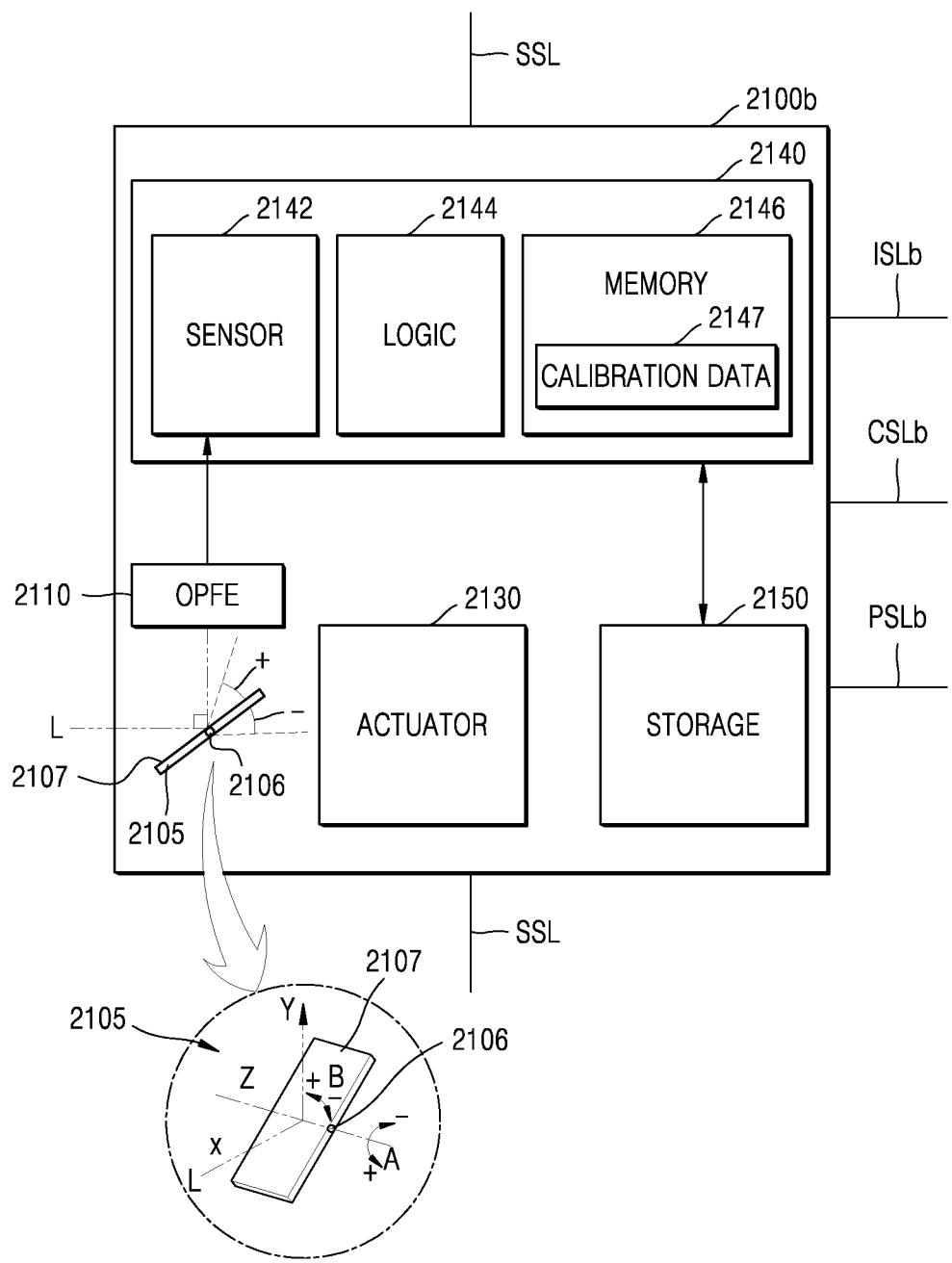
FIG. 12 is a block diagram of a detailed configuration of a camera module according to an example embodiment of the inventive concept.

FIG. 11 is a block diagram of a part of an electronic device according to an example embodiment of the inventive concept. FIG. 12 is a block diagram of a detailed configuration of a camera module according to an example embodiment of the inventive concept. In detail, FIG. 11 is a diagram illustrating an electronic device 2000 as a part of the electronic device 1000 of FIG. 10, and FIG. 12 is a diagram illustrating a detailed configuration of a camera module 2100b of FIG. 11.

Referring to FIG. 11, the electronic device 2000 may include a multi-camera module 2100, an AP 2200, and a memory 2300. Because the memory 2300 is capable of performing the same function as the memory 1400 shown in FIG. 10, a detailed description thereof is omitted.

The electronic device 2000 is capable of capturing and/or storing an image of an object using a complementary metal-oxide-semiconductor (CMOS) image sensor, and may be implemented as a mobile phone, a tablet computer, or a portable electronic device. The portable electronic device may include a laptop computer, a mobile phone, a smartphone, a tablet PC, a wearable device, etc.

The multi-camera module 2100 may include first through third camera modules 2100a through 2100c. The multi-camera module 2100 may include the image sensor 100 of FIG. 1. Although FIG. 11 shows the multi-camera module 2100 including three camera modules, i.e., the first through third camera modules 2100a through 2100c, the inventive concept is not limited thereto, and various numbers of camera modules may be included in the multi-camera module 2100.

Hereinafter, a detailed configuration of the second camera module 2100b is described in more detail with reference to FIG. 12, but the following description may be equally applied to the other camera modules, i.e., the first and third camera modules 2100a and 2100c, according to embodiments.

Referring to FIG. 12, the second camera module 2100b may include a prism 2105, an optical path folding element (OPFE) 2110, an actuator 2130, an image sensing device 2140, and a storage 2150 (e.g., a storage device).

The prism 2105 may include a reflecting surface 2107 of a light reflecting material and change a path of light L incident from outside.

According to an example embodiment, the prism 2105 may change the path of the light L incident in a first direction X to a second direction Y perpendicular to the first direction X. Furthermore, the reflecting surface 2107 of the prism 2105, which is formed of the light reflecting material, may rotate in a direction A around a central axis 2106 or rotate in a direction B around the central axis 2106, thereby changing the path of the light L incident in the first direction X to the second direction Y perpendicular to the first direction X. In this case, the OPFE 2110 may move in a third direction Z that is perpendicular to the first and second directions X and Y.

In an embodiment, as shown in FIG. 12, an A-direction maximum rotation angle of the prism 2105 may be less than or equal to 15 degrees in a positive (+) A direction and greater than 15 degrees in a negative (−) A direction, but embodiments are not limited thereto.

In an embodiment, the prism 2105 may move by an angle of about 20 degrees, in a range between about 10 degrees and about 20 degrees, or in a range between about 15 degrees and about 20 degrees in a positive (+) or negative (−) B direction. In this case, the prism 2105 may move by an angle that is equal or approximately equal within a range of about 1 degree in the positive (+) or negative (−) B direction.

In an embodiment, the reflecting surface 2107 of the prism 2105, which is formed of the light reflecting material, may move in the third direction Z parallel to a direction in which the central axis 2106 extends.

The OPFE 2110 may include, for example, a group of m optical lenses where m is a natural number. The m optical lenses may move in the second direction Y to change an optical zoom ratio of the second camera module 2100b. For example, when a default optical zoom ratio of the second camera module 2100b is Z, the optical zoom ratio of the second camera module 2100b may be changed to 3Z, 5Z, or higher by moving the m optical lenses included in the OPFE 2110.

The actuator 2130 may move the OPFE 2110 or an optical lens (hereinafter, referred to as an optical lens) to a certain position. For example, the actuator 2130 may adjust the position of the optical lens such that an image sensor 2142 is positioned at a focal length of the optical lens for accurate sensing.

The image sensing device 2140 may include the image sensor 2142, a control logic 2144, an encoder 2145, and a memory 2146. The image sensor 2142 may sense an image of an object by using light L provided through the optical lens. Because the image sensor 2142 of FIG. 12 may have similar functions to those of the image sensor 100 of FIG. 1, a detailed description thereof is omitted. The control logic

2144 may control all operations of the second camera module 2100b. For example, the control logic 2144 may control an operation of the second camera module 2100b according to a control signal provided via a control signal line CSLb.

The memory 2146 may store information, such as calibration data 2147, which is used for the operation of the second camera module 2100b. The calibration data 2147 may include information used for the second camera module 2100b to generate image data using the light L provided from outside. For example, the calibration data 2147 may include information about the above-described degree of rotation, information about a focal length, information about an optical axis, etc. When the second camera module 2100b is implemented as a multi-state camera that has a variable focal length according to the position of the optical lens, the calibration data 2147 may include a value of a focal length for each position (or state) of the optical lens and information about auto focusing.

The storage 2150 may store image data sensed by the image sensor 2142. The storage 2150 may be provided outside the image sensing device 2140 and form a stack with a sensor chip of the image sensing device 2140. In an example embodiment, the storage 2150 may include electrically erasable programmable read-only memory (EEPROM), but embodiments are not limited thereto.

Referring to FIGS. 11 and 12 together, in an example embodiment, one (e.g., the first camera module 2100a) of the first through third camera modules 2100a through 2100c may include four adjacent pixels (i.e., tetra cells) sharing the same color information under the same color filter while another camera module (e.g., the second camera module 2100b) may include 9 adjacent pixels (i.e., nona cells) sharing the same color information under the same color filter, but embodiments are not limited thereto.

In an example embodiment, each of the first through third camera modules 2100a through 2100c may include the actuator 2130. Accordingly, each of the first through third camera modules 2100a through 2100c may include the same or a different type of calibration data 2147 according to an operation of the actuator 2130 included therein.

In an example embodiment, one (e.g., the second camera module 2100b) of the first through third camera modules 2100a through 2100c may be a folded-lens type camera module including the prism 2105 and the OPFE 2110 described above while the other camera modules (e.g., the first and third camera modules 2100a and 2100c) may be a vertical type camera module that does not include the prism 2105 and the OPFE 2110.

In an example embodiment, one (e.g., the third camera module 2100c) of the first through third camera modules 2100a through 2100c may be a vertical depth camera which extracts depth information using an infrared ray (IR). In this case, the AP 2200 may generate a three-dimensional (3D) depth image by merging image data provided from the depth camera with image data provided from another camera module (e.g., the first or second camera module 2100a or 2100b).

In an example embodiment, at least two (e.g., the first and second camera modules 2100a and 2100b) of the first through third camera modules 2100a through 2100c may have different field-of-views (FOVs). In this case, for example, at least two (e.g., the first and second camera modules 2100a and 2100b) of the first through third camera modules 2100a through 2100c may respectively include different optical lenses, but embodiments are not limited thereto. For example, the first camera module 2100a among the first through third camera modules 2100a through 2100c may have a smaller FOV than the second and third camera modules 2100b and 2100c. However, the inventive concept is not limited thereto, and the multi-camera module 2100 may further include a camera module having a larger FOV than the first through third camera modules 2100a through 2100c that are originally used.

Furthermore, in some embodiments, the first through third camera modules 2100a through 2100c may each have a different FOV. In this case, the first through third camera modules 2100a through 2100c may respectively include different optical lenses, but embodiments are not limited thereto.

In some embodiments, the first through third camera modules 2100a through 2100c may be physically separated from one another for placement. In other words, the image sensor 2142 may be independently located in each of the first through third camera modules 2100a through 2100c instead of dividing a sensing area of one image sensor 2142 for use by the first through third camera modules 2100a through 2100c.

The AP 2200 may include a plurality of sub processors, i.e., first through third sub processors 2210a through 2210c, a camera module controller 2230, a memory controller 2400, and an internal memory 2250. The AP 2200 may be implemented separately from the first through third camera modules 2100a through 2100c. For example, the AP 2200 and the first through third camera modules 2100a through 2100c may be separately implemented as different semiconductor chips.

Image data or compressed data obtained from each of the first through third camera modules 2100a through 2100c may be provided to a corresponding one of the first through third sub processors 2210a through 2210c via a corresponding one of first through third image signal lines ISLa, ISLb, and ISLc which are separated from one another. For example, image data or compressed data generated from the first camera module 2100a may be provided to the first sub processor 2210a through the first image signal line ISLa, image data or compressed data obtained from the second camera module 2100b may be provided to the second sub processor 2210b through the second image signal line ISLb, and image data or compressed data obtained from the third camera module 2100c may be provided to the sub processor 2210c through the third image signal line ISLc. Such image data transmission may be performed using, for example, a mobile industry processor interface (MIPI) based camera serial interface (CSI), but embodiments are not limited thereto.

In an example embodiment, a single sub processor may be provided for a plurality of camera modules. For example, although FIG. 11 shows that the first and third sub processors 2210a and 2210c are separate from each other, the first and third sub processors 2210a and 2210c may be integrated into a single sub processor, and image data or compressed data provided from the first and third camera modules 2100a and 2100c may be selected by a selection element (e.g., a multiplexer), etc., and then provided to the single sub processor.

The camera module controller 2230 may provide a control signal to each of the first through third camera modules 2100a through 2100c. A control signal generated by the camera module controller 2230 may be provided to a corresponding one of the first through third camera modules 2100a through 2100c via a corresponding one of control signal lines CSLa, CSLb, and CSLc that are separated from one another.

While the inventive concept has been particularly shown and described with reference to embodiments thereof, it will be understood that various changes in form and details may be made therein without departing from the spirit and scope of the following claims.

What is claimed is:

1. An image sensor including a pixel array having a plurality of pixels, wherein each of the plurality of pixels comprises:
    a first photodiode;
    a second photodiode having a larger light-receiving area than the first photodiode;
    a first floating diffusion node where charge generated in the first photodiode is accumulated;
    a second floating diffusion node where charge generated in the second photodiode is accumulated;
    a first capacitor for accumulating a charge overflowing from the first photodiode;
    a first driving transistor configured to generate an output signal corresponding to a voltage of the second floating diffusion node; and
    a second capacitor storing an amount of overflow charges according to an overflow operation for accumulating the overflowing charge and storing an amount of reset charges according to a reset operation for resetting the first floating diffusion node.

2. The image sensor of claim 1, wherein each of the plurality of pixels further comprises:
    a third floating diffusion node where charge transferred from the first floating diffusion node is accumulated;
    a first reset transistor having a first end connected to the third floating diffusion node and a second other end receiving a reset voltage;
    a second reset transistor having a first end connected to the second capacitor and a second other end receiving a reset voltage;
    a sample transistor configured to control the amount of overflow charges and the amount of reset charges to be stored in the second capacitor; and
    a first select transistor configured to output the output signal to a column line as a pixel signal.

3. The image sensor of claim 2, wherein each of the plurality of pixels further comprises a second select transistor configured to output, as a pixel signal, the amount of overflow charges and the amount of reset charges stored in the second capacitor to the column line.

4. The image sensor of claim 3, wherein the sample transistor has a first end connected to the first driving transistor and the first select transistor and a second other end connected to the second reset transistor, the second select transistor, and the second capacitor.

5. The image sensor of claim 3, wherein each of the plurality of pixels further comprises a second driving transistor having a first end connected to the second select transistor and a second other end receiving a driving voltage.

6. The image sensor of claim 5, wherein the sample transistor has a first end connected to the first driving transistor and the first select transistor and a second other end connected to the second reset transistor, the second driving transistor, and the second capacitor.

7. The image sensor of claim 5, wherein the sample transistor has a first end connected to the third floating diffusion node and a second other end connected to the second reset transistor, the second driving transistor, and the second capacitor.

8. The image sensor of claim 2, which is configured to, during an exposure period,
    turn on the first reset transistor to reset the first capacitor and the first floating diffusion node,
    turn on the second reset transistor to reset the second capacitor, and
    turn on the sample transistor to store the amount of reset charges in the second capacitor.

9. The image sensor of claim 3, which is configured to, during a time interval of a low conversion gain (LCG) mode within a readout period of the first photodiode,
    turn on the second select transistor to output the amount of reset charges stored in the second capacitor as a reset signal,
    after outputting the reset signal, turn on the second reset transistor to reset the second capacitor,
    after resetting the second capacitor, turn on the sample transistor to store the amount of overflow charges in the second capacitor, and
    after storing the amount of overflow charges in the second capacitor, turn on the second select transistor to output the amount of overflow charges stored in the second capacitor as an image signal.

10. The image sensor of claim 8, which is configured to, during a time interval of a low conversion gain (LCG) mode within a readout period of the first photodiode,
    turn on the sample transistor and the first select transistor to output the amount of reset charges stored in the second capacitor as a reset signal,
    after outputting the reset signal, turn on the second reset transistor to reset the second capacitor,
    after resetting the second capacitor, turn off the second reset transistor and turn on the sample transistor to store the amount of overflow charges in the second capacitor,
    after storing the amount of overflow charges in the second capacitor, turn off the sample transistor and the first select transistor and turn on the first reset transistor to reset the second floating diffusion node, and
    after resetting the second floating diffusion node, turn off the first reset transistor and turn on the first select transistor and the sample transistor to output the amount of overflow charges stored in the second capacitor as an image signal.

11. The image sensor of claim 2, wherein each of the plurality of pixels further comprises:
    a third reset transistor configured to reset the second floating diffusion node;
    a third driving transistor configured to generate a pixel signal corresponding to a voltage of the third floating diffusion node; and
    a second select transistor configured to output the amount of overflow charges and the amount of reset charges the reset charges to the column line.

12. The image sensor of claim 11, which is configured to, during an exposure period,
    turn on the third reset transistor to reset the second floating diffusion node,
    turn on the first reset transistor to reset the first capacitor, the first floating diffusion node, and the third floating diffusion node,
    turn on the second reset transistor to reset the second capacitor, and
    turn on the sample transistor to store the amount of reset charges in the second capacitor.

13. The image sensor of claim 12, which is configured to, during a time interval of a low conversion gain (LCG) mode within a readout period of the first photodiode, turn on the second select transistor to output the amount of reset charges stored in the second capacitor as a reset signal, turn off the second select transistor and turn on the second reset transistor to reset the second capacitor, after resetting the second capacitor, turn off the second reset transistor and turn on the sample transistor to store the amount of overflow charges in the second capacitor, and after storing the amount of overflow charges in the second capacitor, turn off the sample transistor and turn on the second select transistor to output the amount of overflow charges as an image signal.

14. An image sensor including a pixel array having a plurality of pixels, wherein each of the plurality of pixels comprises:
   a first photodiode;
   a second photodiode having a larger light-receiving area than the first photodiode;
   a first floating diffusion node where charge generated in the first photodiode is accumulated;
   a second floating diffusion node where charge generated in the second photodiode is accumulated;
   a third floating diffusion node where charge transferred from the first floating diffusion node is accumulated;
   a conversion gain transistor having a first end connected to the third floating diffusion node and a second other end connected to the second floating diffusion node;
   a first capacitor accumulating charge overflowing from the first photodiode;
   a first driving transistor configured to generate an output signal corresponding to a voltage of the second floating diffusion node; and
   a second capacitor storing an amount of overflow charges according to an overflow operation for accumulating the overflowing charge and storing an amount of reset charges according to a reset operation for resetting the first floating diffusion node.

15. The image sensor of claim 14, wherein each of the plurality of pixels further comprises:
   a first reset transistor having a first end connected to the third floating diffusion node and a second other end receiving a reset voltage;
   a second reset transistor having a first end connected to the second capacitor and a second other end receiving a reset voltage;
   a sample transistor configured to control the amount of overflow charges and the amount of reset charges to be stored in the second capacitor; and
   a first select transistor configured to output the output signal to a column line as a pixel signal.

16. The image sensor of claim 15, wherein each of the plurality of pixels further comprises a second select transistor configured to output, as a pixel signal, the amount of overflow charges and the amount of reset charges stored in the second capacitor to the column line.

17. The image sensor of claim 16, which is configured to, during a time interval of a low conversion gain (LCG) mode within a readout period of the first photodiode,
   maintain the conversion gain transistor in a turned-on state,
   turn on the second select transistor to output the amount of reset charges stored in the second capacitor as a reset signal,
   after outputting the reset signal, turn on the second reset transistor to reset the second capacitor,
   after resetting the second capacitor, turn on the sample transistor to store the amount of overflow charges in the second capacitor, and
   after storing the amount of overflow charges in the second capacitor, turn on the second select transistor to output the amount of overflow charges stored in the second capacitor as an image signal.

18. The image sensor of claim 16, which is configured to, during a time interval of a low conversion gain (LCG) mode within a readout period of the first photodiode,
   maintain the conversion gain transistor in a turned-on state,
   turn on the sample transistor and the first select transistor to output the amount of reset charges stored in the second capacitor as a reset signal,
   after outputting the reset signal, turn on the second reset transistor to reset the second capacitor,
   after resetting the second capacitor, turn off the second reset transistor and turn on the sample transistor to store the amount of overflow charges in the second capacitor,
   after storing the amount of overflow charges in the second capacitor, turn off the sample transistor and the first select transistor and turn on the first reset transistor to reset the second floating diffusion node, and
   after resetting the second floating diffusion node, turn off the first reset transistor and turn on the first select transistor and the sample transistor to output the amount of overflow charges stored in the second capacitor as an image signal.

19. An image sensor including a pixel array having a plurality of pixels, wherein each of the plurality of pixels comprises:
   a first photodiode;
   a second photodiode having a larger light-receiving area than the first photodiode;
   a first floating diffusion node where charge generated in the first photodiode is accumulated;
   a second floating diffusion node where charge generated in the second photodiode is accumulated;
   a third floating diffusion node where charge transferred from the first floating diffusion node is accumulated;
   a first capacitor accumulating charge overflowing from the first photodiode;
   a driving transistor configured to generate an output signal corresponding to a voltage of the third floating diffusion node;
   a second capacitor storing an amount of overflow charges according to an overflow operation for accumulating the overflowing charge and storing an amount of reset charges according to a reset operation for resetting the first floating diffusion node;
   a reset transistor having a first end connected to the second capacitor and a second other end receiving a reset voltage;
   a sample transistor configured to control the amount of overflow charges and the amount of reset charges to be stored in the second capacitor;
   a first select transistor configured to output, as a pixel signal, an output signal corresponding to a voltage of the second floating diffusion node to a column line;
   a second select transistor configured to respectively output, to the column line, the amount of overflow charges and the amount of reset charges stored in the second capacitor as an image signal and a reset signal; and a third select transistor configured to output, to the column line, at least a part of the output signal corresponding to the voltage of the third floating diffusion node as a pixel signal.

20. The image sensor of claim 19, which is configured to, during a time interval of a low conversion gain (LCG) mode within a readout period of the first photodiode,
  turn off the third select transistor and turn on the second select transistor to output the amount of reset charges stored in the second capacitor as a reset signal,
  turn off the second select transistor and turn on the reset transistor to reset the second capacitor,
  after resetting the second capacitor, turn off the reset transistor and turn on the sample transistor to store the amount of overflow charges in the second capacitor, and
  after storing the amount of overflow charges in the second capacitor, turn off the sample transistor and turn on the second select transistor to output the amount of overflow charges stored in the second capacitor as an image signal.

\* \* \* \* \*